United States Patent
Hattori et al.

(10) Patent No.: US 7,097,726 B2
(45) Date of Patent: Aug. 29, 2006

(54) IDENTIFICATION CARD PREPARATION METHOD AND PROTECTIVE LAYER TRANSFER FOIL

(75) Inventors: Ryoji Hattori, Hino (JP); Shigehiro Kitamura, Hino (JP)

(73) Assignee: Konica Corporation, Tokyo (JP)

( * ) Notice: Subject to any disclaimer, the term of this patent is extended or adjusted under 35 U.S.C. 154(b) by 151 days.

(21) Appl. No.: 10/668,715

(22) Filed: Sep. 23, 2003

(65) Prior Publication Data
US 2004/0065403 A1    Apr. 8, 2004

(30) Foreign Application Priority Data
Oct. 3, 2002    (JP)    ............ 2002-291529

(51) Int. Cl.
*B44C 1/00*    (2006.01)
(52) U.S. Cl. ............ 156/230; 156/182; 156/237; 156/239; 156/240; 156/241; 156/361; 430/14; 430/18

(58) Field of Classification Search .......... 156/230, 156/237, 239, 240, 241, 182, 361; 430/14, 430/18
See application file for complete search history.

(56) References Cited

U.S. PATENT DOCUMENTS 6,638,635 B1 *  10/2003  Hattori et al. .......... 428/500

* cited by examiner

*Primary Examiner*—Nasser Ahmad
(74) *Attorney, Agent, or Firm*—Lucas & Mercanti, LLP

(57) ABSTRACT

The invention relates to a preparation method of an identification card with utilizing a protective layer transfer foil having a peeling layer and a releasing layer laminated on the peeling layer, the preparation method comprising: adhering the transferring layer onto a card substrate; and peeling off the peeling layer to prepare the identification card. The peeling layer including a support and a releasing layer, the transferring layer including a photo-cured resin layer. A maximum electrostatic amount of the peeling layer at the peeling step is 0 to 30 kV.

17 Claims, 15 Drawing Sheets

IDENTIFICATION CARD PREPARATION METHOD AND PROTECTIVE LAYER TRANSFER FOIL

TECHNICAL FIELD

The present invention relates to a contact type or non-contact type electronic or magnetic card which stores personal information requiring security such as thwarting of forgery and falsification, a identification card preparation method which is suitably applied to a facial image containing card with an image protective layer, and a protective layer transfer foil used for the same.

TECHNICAL BACKGROUND

In recent years, in the service industry field such as public agencies, banks, companies, medical entities, and educational institutions, widely employed are ID cards (also referred to as identification card) such as identification cards, passports, alien registration cards, library cards, cash cards, credit cards, licenses such as driver's licenses, employee identification cards, company member identification cards, membership cards, medical cards, and student identification cards. In such cards, facial images of the card bearers are recorded to identify card as well as textual information images such as text and marks related to the card bearer. Consequently, frequently performed are printing and the like for the purpose of thwarting forgery and falsification of cards. In recent years, widely employed are various contact type or non-contact type electronic cards, or magnetic cards, which store personal information.

In typical cases, the aforesaid facial images are formed by multi-density level full color images which are formed employing, for example, a sublimation type thermosensitive transfer recording system or a silver halide color photographic system. Further, the textual information is comprised of binary images and are formed by employing, for example, a fusion type thermosensitive transfer recording system, a sublimation type thermosensitive transfer recording system, a silver halide color photographic system, an electrophotographic system, an ink jet system, and a re-transfer system. In addition, to thwart forgery and falsification, employed are holograms and fine line patterns. Further, if desired, a standard format is previously printed onto the ID cards.

Some of the conventional card preparation methods enhance surface protection properties by transferring a single layer comprised of a resinous sheet. For example, such methods are described in Unexamined Japanese Patent Application Publication (hereinafter referred to as JP-A) No. 10-863 (pages 2–4), Japanese Patent No. 2609871 (pages 1–6), Japanese Patent No. 2626801 (pages 1–6 and FIGS. 1 and 2), JP-A No. 8-224982 (pages 1–4 and FIGS. 1–3), Japanese Patent No. 2832478 (pages 1–6 and FIGS. 1–3), Examined Japanese Patent Application Publication (hereinafter referred to JP-B) No. 7-45279 (pages 1, 2, and 4 and FIGS. 1 and 2), Japanese Patent No. 2807898 (pages 1–4), Japanese Patent No. 2524810 (pages 1, 2, and 4 and FIG. 1) and JP-B No. 6-98849 (pages 1–3 and 5 and FIG. 1). Further, some methods perform twice the transfer process to enhance mechanical strength. For example, such methods are described in JP-A No. 11-184270 (pages 2–6 and FIGS. 1, 2, and 5–8) and JP-B No. 11-268457 (pages 1–4 and FIG. 1). Still further, antistatic techniques are disclosed while employing conventional transfer foils. For example, such techniques are described in JP-A No. 7-017195 (pages 1–3 and FIG. 1) and JP-A No. 7-299994 (pages 1–3 and FIG. 1).

Further, for the purpose of enhancing lightfastness of images, some cards use ultraviolet absorbents in the card surface protective layer. Such cards are disclosed in, for example, JP-A No. 6-067592 (pages 1–5 and FIGS. 1–3), JP-A No. 7-205597 (pages 1–6 and FIGS. 1 and 2) and JP-A No. 2002-211091 (pages 1–3 and 5, and FIGS. 1–3).

In conventional methods described in above-mentioned Patent Documents, surface protective properties are enhanced by transferring a single resinous sheet layer. However, mechanical strength (hereinafter referred to as scratch resistance) was insufficient.

Further, in some method, in order to enhance mechanical strength transfer is carried out twice. However, problems occur in which adhesion property between foils is degraded due to weak adhesion between the second foil and the first foil.

Still further, in any production cases in which such an image protective layer transfer system is employed, when a transfer foil is transferred onto a card, charge accumulates during peeling, whereby dust in the interior of the transfer apparatus is adhered onto the card substrate prior to transfer. As a result, problems occur in which during winding the transferred support, dust falls or dust in the apparatus is wound up together with the support, whereby cards of poor external appearance are produced. Specifically, when transfer is repeated twice to enhance the aforesaid mechanical strength, problems occur during the first transfer, in that dust is adhered on a card which was subjected to transfer and during the second transfer, the aforesaid dust is wound up, resulting in foreign matter problems as well as a decrease in adhesion between foils. In addition, static charge results in operational problems which cause bugs in PCs and databases which control the image forming apparatus as well as the transfer apparatus.

Still further, when transfer is repeated twice to enhance the aforesaid mechanical strength, the charge amount in the apparatus increases due to accumulation of electrostatic charge due to peeling at two positions, whereby problems occur in which bugs are more readily formed. In the conventional antistatic techniques related to transfer foils, improvement is tried by the addition of surfactants to a portion of the transfer foil or the use of a curable antistatic layer. However, adhesion of dust on cards has not been minimized and scratch resistant has also not been sufficient.

Further, in order to enhance lightfastness of images, UV absorbents are employed in the surface protective layer of cards. However, surface protective properties have been degraded due to the addition of UV absorbents, and light fastness has not been sufficiently improved due to the absence of UV absorbents near images.

SUMMARY OF THE INVENTION

From the viewpoint of the foregoing, the present invention was achieved. The present invention provides a preparation method for a identification card which is capable of enhancing security such as thwarting of forgery and falsification and is also capable of minimizing adhesion of dust on cards, minimizing operational degradation due to apparatus bugs, and enhancing scratch resistance, adhesion property between layers, lightfastness, and solvent resistance, and a protective layer transfer foil.

In order to solve the aforesaid problems and to provide the preparation method and the foil of the present invention, the present invention is constituted as described below.

A first structure of the invention is a preparation method of an identification card with utilizing a protective layer transfer foil and a card substrate, the protective layer transfer foil having a peeling layer and a transferring layer laminated on the peeling layer. The peeling layer includes a support and a releasing layer having a coated amount of more than 0 and not more than 3.0 g/m$^2$, and the transferring layer includes a photo-cured resin layer having a coated amount of 3.0 to 15 g/m$^2$. The preparation method comprises the steps of: adhering the transferring layer onto the card substrate; and peeling off the peeling layer to prepare the identification card. Further, a maximum electrostatic charge of the peeling layer at the peeling step is 0 to 30 kV.

According to the aforesaid structure, by employing a protective layer transfer foil and by transferring the transferring layer comprised of a photo-cured resin layer, lamination properties (adhesion properties) as well as scratch resistance is improved, and by retarding the peeling electrostatic charge so that the maximum electrostatic charge of the peeling layer is adjusted to 0–30 kV, it is possible to prepare identification cards of negligible appearance degradation due to minimal adhesion of dust on the card surface, and apparatus bugs are effectively minimized.

A second structure of the invention is a preparation method of an identification card with utilizing a protective layer transfer foil and a card substrate, the protective layer transfer foil having a peeling layer and a transferring layer laminated on the peeling layer. The peeling layer includes a support and a releasing layer having a coated amount of more than 0 and not more than 3.0 g/m$^2$, and the transferring layer includes a photo-cured resin layer having a coated amount of 3.0 to 15 g/m$^2$. The preparation method comprises the steps of: adhering the transferring layer onto the card substrate; and peeling off the peeling layer to prepare the identification card. Further, a maximum electrostatic charge of the identification card at the peeling step is 0 to 10 kV.

According to the aforementioned structure, a protective layer transfer foil is employed, and by transferring the transferring layer comprised of a photo-cured resin layer, lamination properties (adhesion properties) as well as scratch resistance is improved, and by retarding the peeling electrostatic charge so that the maximum electrostatic charge of the identification card is adjusted to 0–10 kV, it is possible to prepare identification cards of negligible appearance degradation due to minimal adhesion of dust on the card surface, and apparatus bugs are effectively minimized.

The third structure of the invention is a protective layer transfer foil comprising a peeling layer and a transferring layer laminated on the peeling layer. The peeling layer including a support and a releasing layer having a coated amount of more than 0 and not more than 3.0 g/m$^2$, the transferring layer including a photo-cured resin layer having a coated amount of 3.0 to 15 g/m$^2$. Further, the transferring layer comprises an intermediate layer or an adhesive layer. The intermediate layer or the adhesive layer is adjacent to the photo-cured resin layer and contains a polyvinylbutyral resin or polybutyral and at least one of an ultraviolet absorbent, an antioxidant and a photo stabilizer.

According to the aforesaid structure, by incorporating at least one of a Ultraviolet absorbent, an antioxidant, and a photo stabilizer into the intermediate layer or the adhesive layer of the protective layer transfer foil, it is possible to enhance lightfastness, and by employing the specified materials, it is also possible to enhance adhesion between layers, solvent resistance and scratch resistance.

EMBODIMENTS OF THE INVENTION

The preparation method of an identification card of the present invention and the protective layer transfer foil used for the preparation method will now be detailed with reference to drawings. However, the present invention is not limited thereto.

Figure 1:
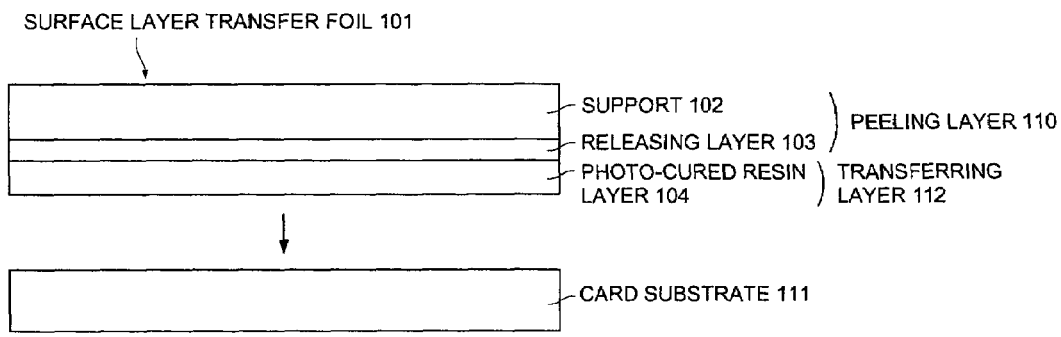
FIGS. 1(a) to 1(c) are schematic structural views describing preparation of an identification card.
Figure 1:
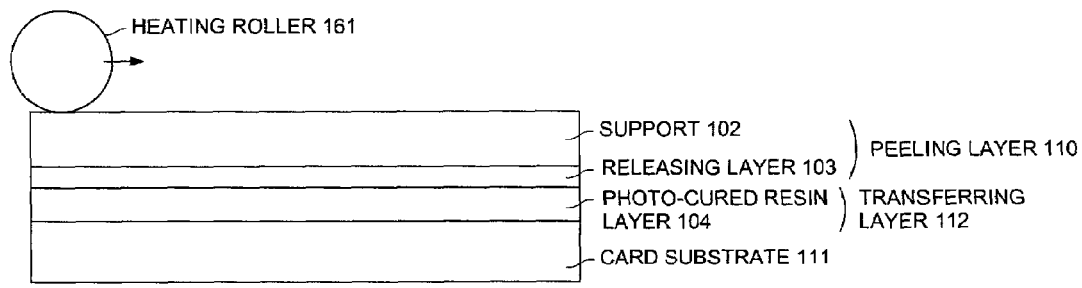
Figure 1:
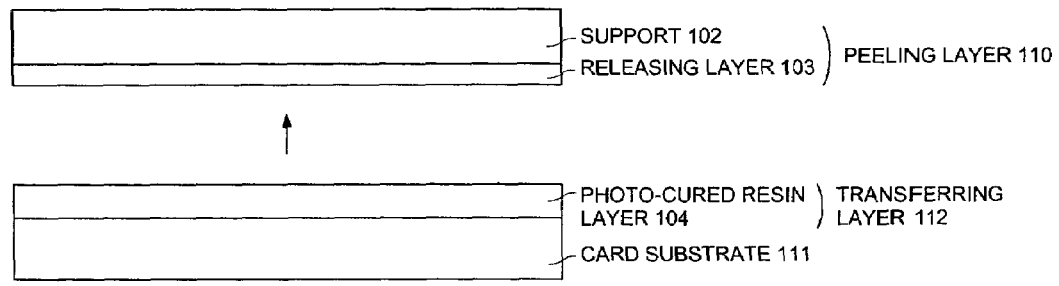

FIGS. 1(a) to 1(c) is a schematic structural view describing preparation of identification cards. In this embodiment, protective layer transfer foil 101 is employed and a transferring layer 112 (photo-cured resin layer 104) is transferred onto card substrate 111, employing heating roller 161. Protective layer transfer foil 101 comprises peeling layer 110 including support 102 and releasing layer 103 of more than 0 to 3.0 g/m$^2$ and transferring layer 112 including photo-cured resin layer 104 of 3.0 to 15 g/m$^2$.

As a first preferable embodiment, protective layer transfer foil 101 is employed, and transferring layer 112 comprised of photo-cured resin layer 104 is transferred onto card substrate 111. And then, peeling layer 110 is peeled. The maximum electrostatic charge of the peeling layer at the peeling step is in 0–30 kV.

In such a manner, by transferring transferring layer 112 comprised of photo-cured resin layer 104 onto card substrate 111, employing protective layer transfer foil 101, it is possible to enhance lamination properties (adhesion properties) as well as scratch resistance. Further, by maintaining the peeling electrostatic charge at a low level at the peeling step so that the maximum electrostatic charge of peeling layer 110 is adjusted to 0–30 KV, it is possible to prepare identification cards without degradation of external appearance due to adhesion of dust on the card surface. Further, it is possible to effectively minimize apparatus bugs in such a manner that bugs due to charge do not form in PCs and databases which control the image forming apparatus as well as the transfer apparatus.

Further, as a second preferable embodiment, protective layer transfer foil 101 is employed and transferring layer 112 comprised of photo-cured resin layer 104 is transferred onto card substrate 111. Peeling layer 110 is peeled while a maximum electrostatic charge of the card including transferring layer 112 and card substrate 111 being in 0–10 KV. By maintaining a peeling electrostatic charge at a low level during transfer so that the maximum electrostatic charge of the card is adjusted to 0–10 KV, it is possible to prepare identification cards without degradation of external appearance due to adhesion of dust on the card surface. Further, it is possible to effectively minimize creation of apparatus bugs.

Still further, as a third preferable embodiment, protective layer transfer foil 101 is employed and transferring layer 112 comprised of photo-cured resin layer 104 is transferred onto card substrate 111. Peeling layer 110 is peeled while a maximum electrostatic charge of peeling layer 110 being in 0–30 KV and a maximum electrostatic charge of the card including transferring layer 112 and card substrate 111 being in 0–10 KV. By maintaining a peeling electrostatic charge at a low level during transfer, it is possible to prepare identification cards without degradation of external appearance due to adhesion of dust on the card surface. Further, it is possible to effectively minimize creation of apparatus bugs.

Figure 2:
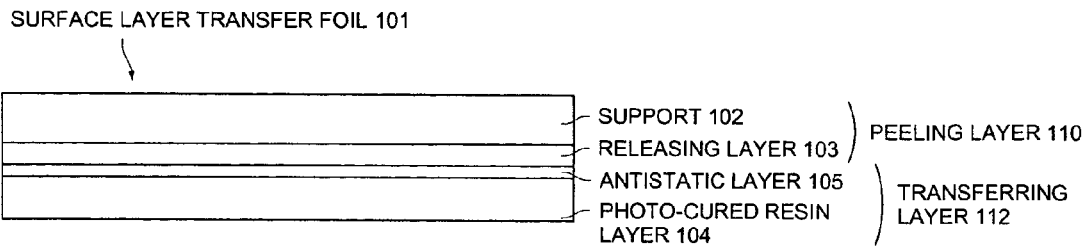
FIGS. 2(a) to 2(d) are schematic structural views of protective layer transfer foils.
Figure 2:
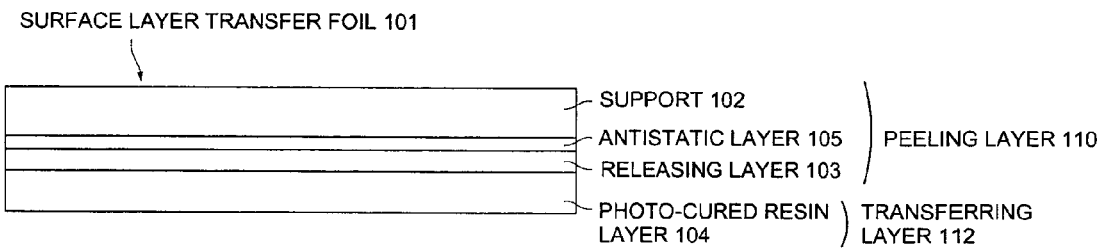
Figure 2:
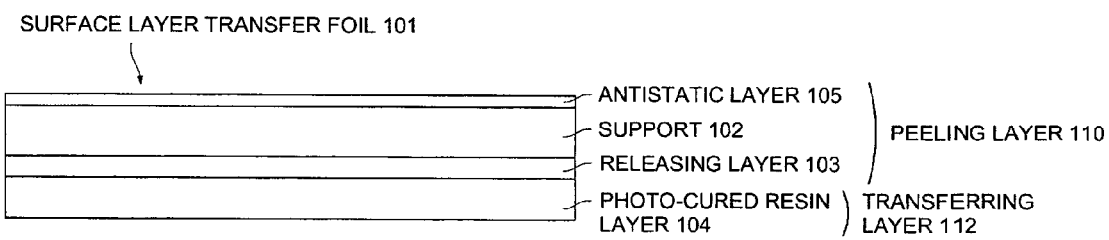
Figure 2:
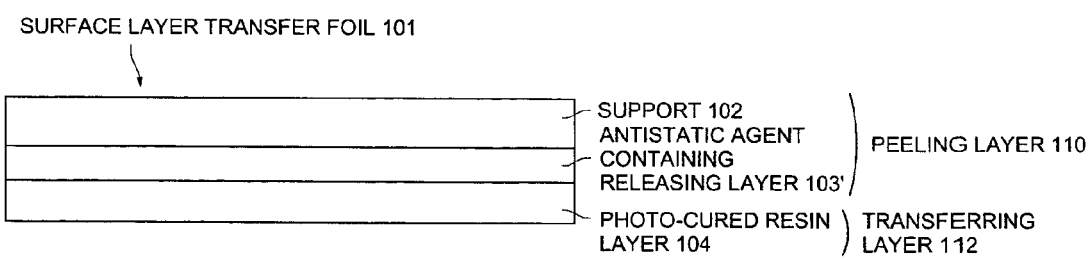

FIGS. 2(a) to 2(d) shows protective layer transfer foil 101 employed in aforesaid embodiments. In the present invention, it is possible to employ FIG. 2(a)–FIG. 2(d). Of these, FIGS. 2(a), 2(b), and 2(d), in which antistatic layer 105 is provided between photo-cured resin layer 104 and support 102, are preferred. In FIG. 2(a), antistatic layer 105 is provided between photo-cured resin layer 104 and releasing layer 103, in FIG. 2(b), antistatic layer 105 is provided between support 102 and releasing layer 103. By providing antistatic layer 105 between photo-cured resin layer 104 of protective layer transfer foil 101 and support 102, it is possible more effectively minimize adhesion of dust on the card surface.

Further, in FIG. 2(c), antistatic layer 105 is provided on the opposite side of releasing layer 103 of support 102. Still further, antistatic layer 105 may be formed to include one of minute metal oxide particles, an electrically conductive powder, or an electrically conductive resin, while in FIG. 2(d), antistatic agent containing releasing layer 103' is provided.

Figure 3:
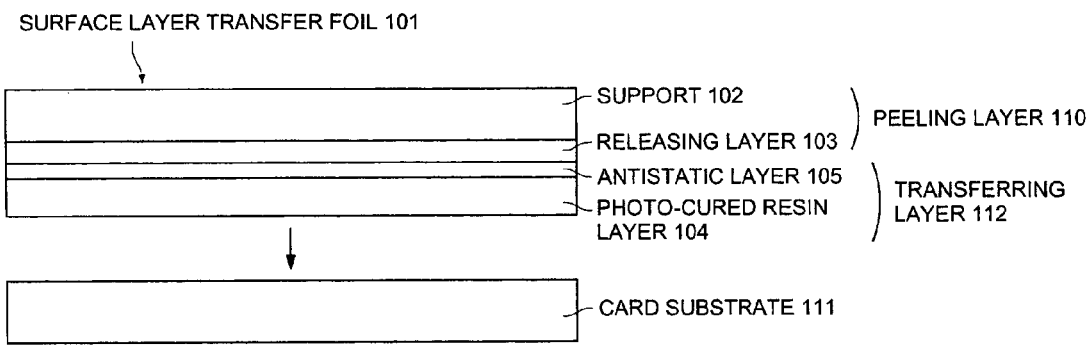
FIGS. 3(a) and 3(b) are schematic structural views of another embodiment describing preparation of an identification card.
Figure 3:
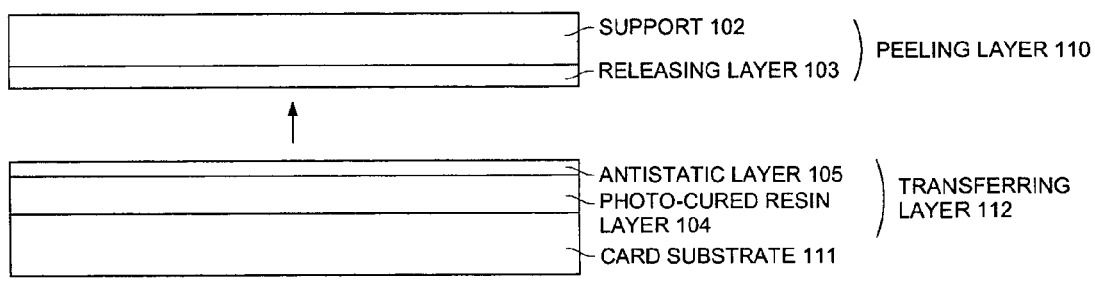
Figure 4:
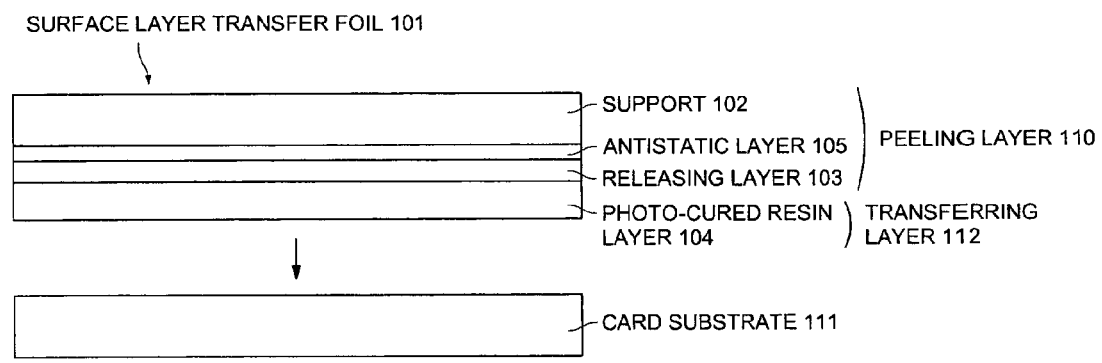
FIGS. 4(a) and 4(b) are schematic structural views of still another embodiment describing preparation of an identification card.
Figure 4:
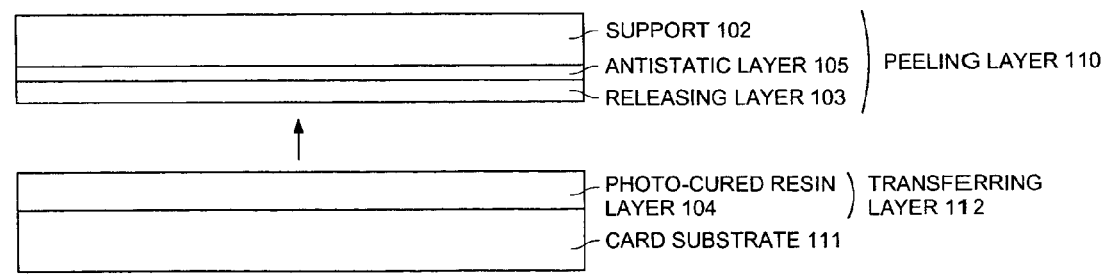
Figure 5A:
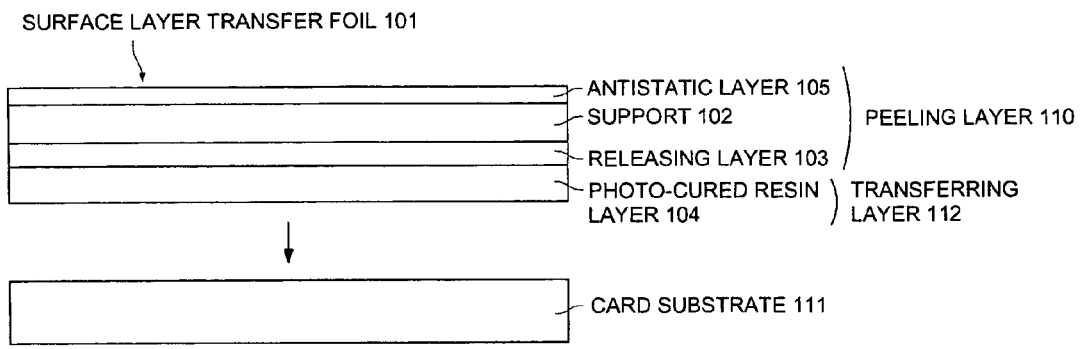
FIGS. 5(a) and 5(b) is schematic structural views of yet another embodiment describing preparation of an identification card.
Figure 5B:
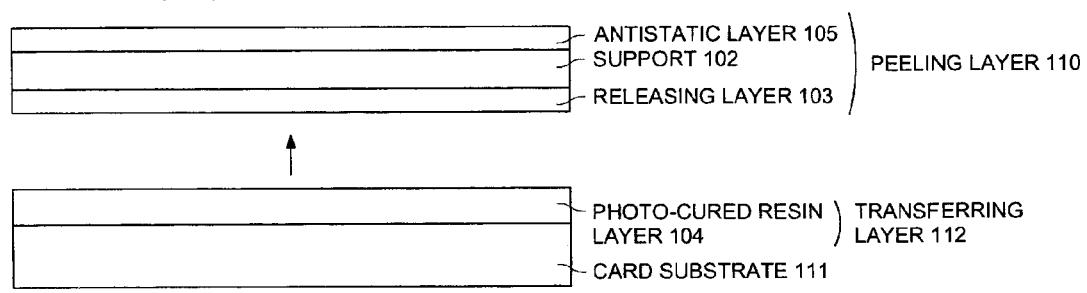
Figure 6A:
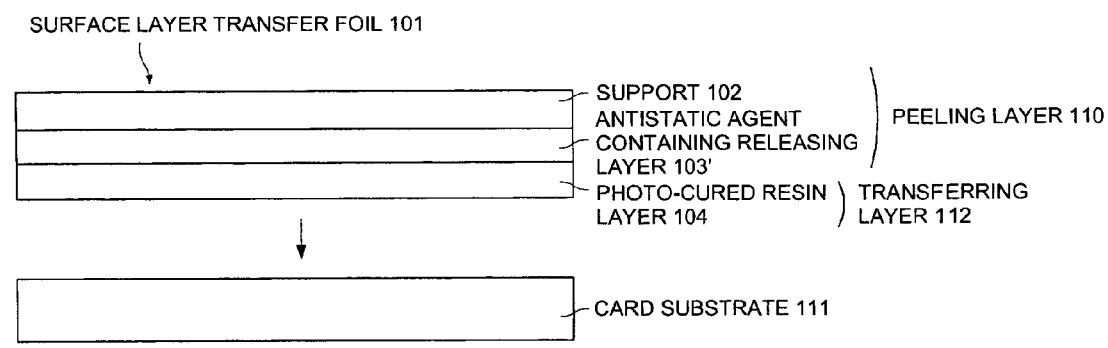
FIGS. 6(a) and 6(b) are schematic structural views of still further embodiment describing preparation of an identification card.
Figure 6B:
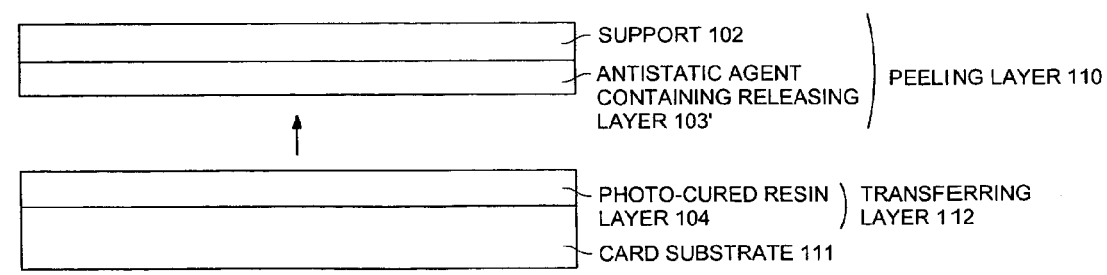

Still further, protective layer transfer foils 101, shown in FIGS. 2(a) to 2(d), are employed, and as shown in FIGS. 3(a)–6(b), transferring layer 112 comprised of photo-cured resin layer 104 is transferred onto card substrate 111. FIGS. 3(a) and 3(b) show a case in which protective layer transfer foil 101, shown in FIG. 2(a), is employed; FIGS. 4(a) and 4(b) show a case in which protective layer transfer foil 101, shown in FIG. 2(b), is used; FIGS. 5(a) and 5(b) show a case in which protective layer transfer foil 101, shown in FIG. 2(c), is used; and FIGS. 6(a) and 6(b) show a case in which protective layer transfer foil 101, shown in FIG. 2(d), is used. FIGS. 3(a)–6(b) are schematic views of transfer.

When aforesaid protective layer transfer foil 101 is employed, after transfer, the peeling layer is peeled at a maximum electrostatic charge of peeling layer 110 of at most 30 KV or at a maximum electrostatic charge of the card including transferring layer 112 and the card substrate 111 of at most 10 KV. As noted above, by maintaining the peeling electrostatic charge of peeling layer 110 or the card at a low level during peeling, it is possible to prepare identification cards without degradation of the external appearance due to adhesion of dust on the card surface. Further, it is possible to effectively minimize formation of apparatus bugs.

Still further, in the embodiments shown in FIGS. 1(a) to 1(c) and 3(a)–6(b), protective layer transfer foil 101 is employed and transferring layer 112 is transferred onto card substrate 111 at least once. Namely, by transferring transferring layer 112 onto card substrate 111 a plurality of times, it is possible to enhance security such as thwarting of forgery and falsification and to simultaneously enhance scratch resistance.

Figure 7:
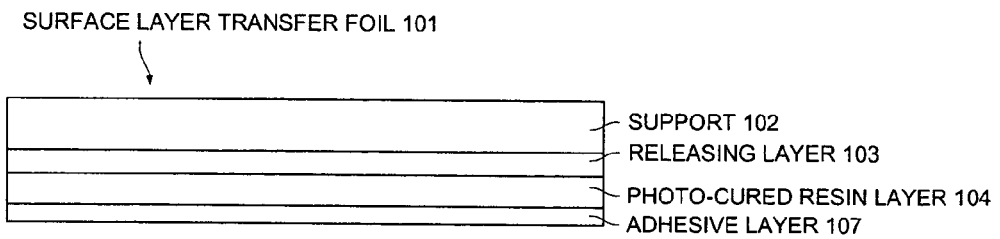
FIGS. 7(a) to 7(d) are schematic structural views of other protective layer transfer foils.
Figure 7:
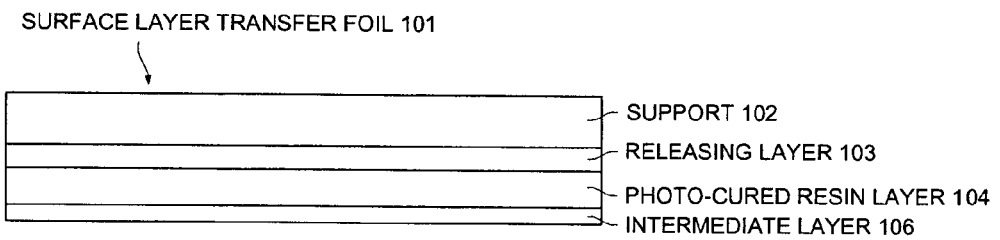
Figure 7:
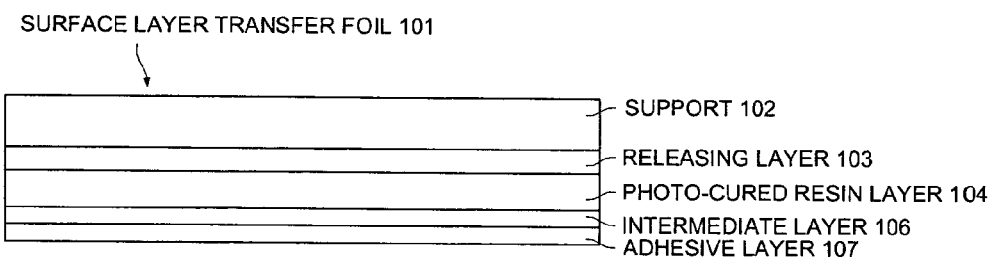
Figure 7:
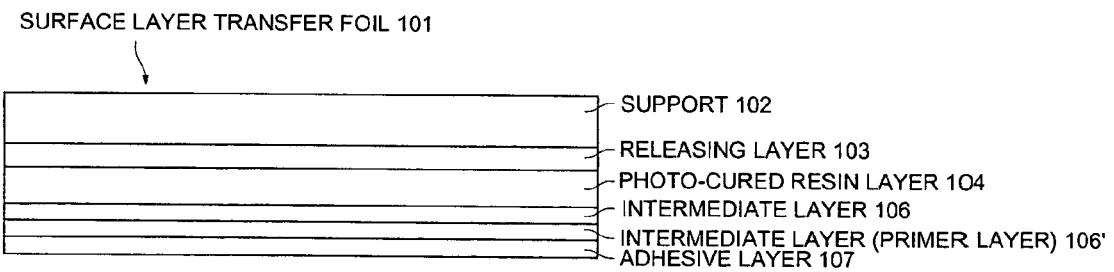
Figure 8:
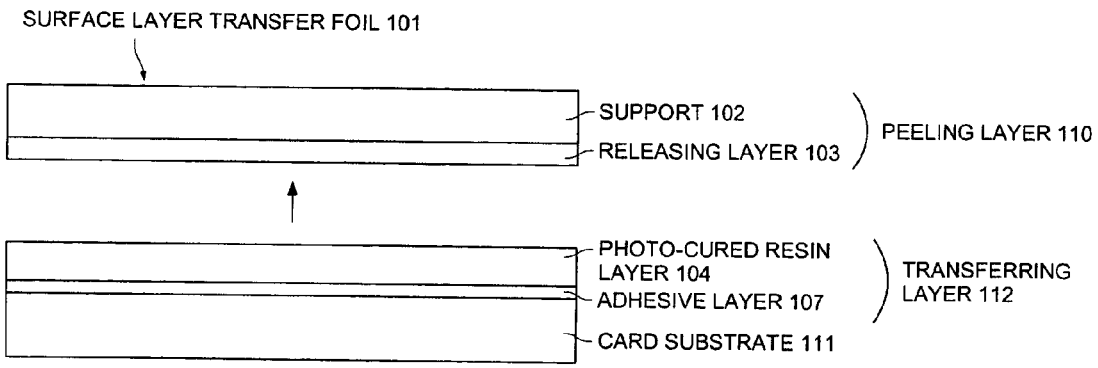
FIGS. 8(a) to 8(d) is schematic structural views of other embodiments to describing preparation of an identification card.
Figure 8:
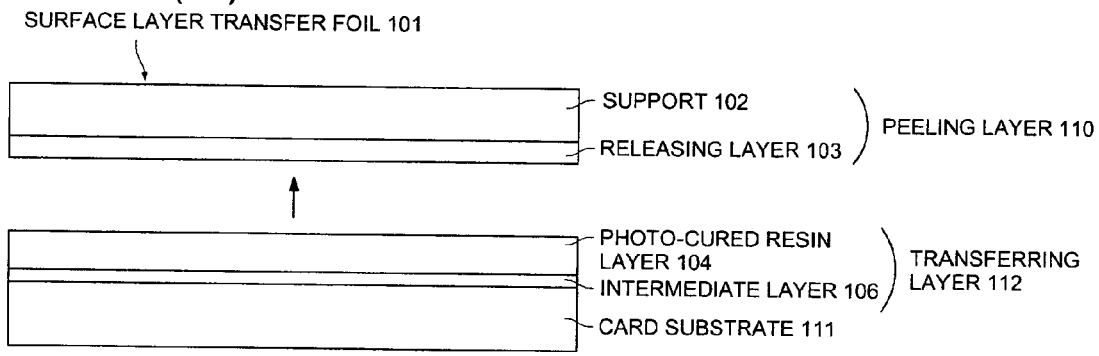
Figure 8:
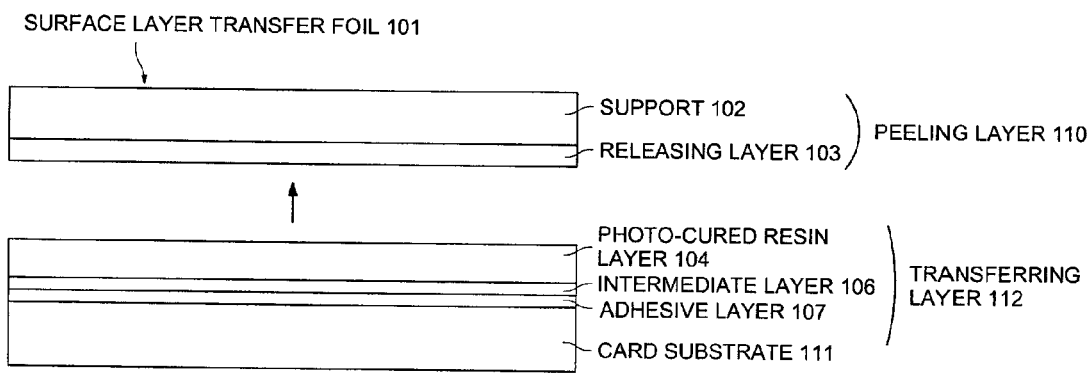
Figure 8:
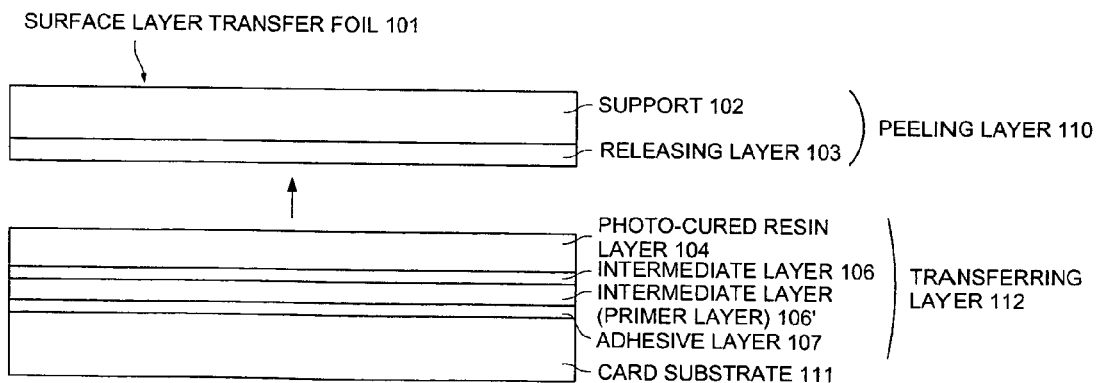

Still further, as shown in FIG. 7(a), protective layer transfer foil 101 may comprise adhesive layer 107 adjacent to photo-cured resin layer 104, and as shown in FIG. 7(b), may comprise intermediate layer 106 adjacent to photo-cured resin layer 104, as shown in FIG. 7(c) may comprise intermediate layer 106 adjacent to photo-cured resin layer 104, as shown in FIG. 7(d), may comprise intermediate layer 106, intermediate layer (a primer layer) 106', and adhesive layer 107 adjacent to photo-cured resin layer 104. Aforesaid intermediate layer 106 or intermediate layer (a primer layer) 106' and adhesive layer 107 is formed preferably employing polyvinyl butyral resins or polybutyral.

Protective layer transfer foil 101 shown in aforesaid FIGS. 7(a)–(d) is employed, and as shown in FIGS. 8(a)–(d), the transferring layer 112 is transferred onto card substrate 111 at least once. Intermediate layer 106 and adhesive layer 107 comprise at least one of an ultraviolet absorbent, an antioxidant, and a photo stabilizer. By employing those layers, it is possible to enhance lightfastness, and by employing specified materials, it is possible to enhance adhesion between layers, as well as solvent resistance and further scratch resistance. FIGS. 8(a) to 8(d) are schematic views of the preparation method employing protective layer transfer foil 101 of the invention.

Further, the coated amount of the layer comprising at least one of an ultraviolet absorbent, an antioxidant, and a photo stabilizer is preferably 0.05–15.0 g/m$^2$. By specifying a layer thickness, it is possible to enhance lightfastness, adhesion between layers, solvent resistance, and further scratch resistance.

Card substrate 111, employed in the present invention and an ID card (identification card) including such as an IC card will now be described. FIGS. 9(a) and 9(b) show the layer configuration of the ID card. The ID card, shown in FIG. 9(a), which is in the embodiment, comprises support 111a having writing layer 111b capable of being written on the outermost surface on one side and image receptive layer 111c on the outermost surface on the other side of support 111a. Personal identification information 111c including a name as well as a facial image is provided onto aforesaid image receptive layer 111c, employing a sublimation thermal transfer and/or fusion thermal transfer system, an ink jet system, or a re-transfer system. Further, first protective layer 111d may be provided on aforesaid image receptive layer 111c. The ID card in this embodiment shown in FIG. 9(b) is prepared in such a manner that protective layer transfer foil 101 is employed, and surface protective layer 111e (transferring layer 112) comprised of a photo-cured resin layer, is provided onto first protective layer 111d.

In the aforesaid ID card, a cushioning layer may be provided between support 111a and writing layer 111b or between support 111a and image receptive layer 111c.

Figure 10:
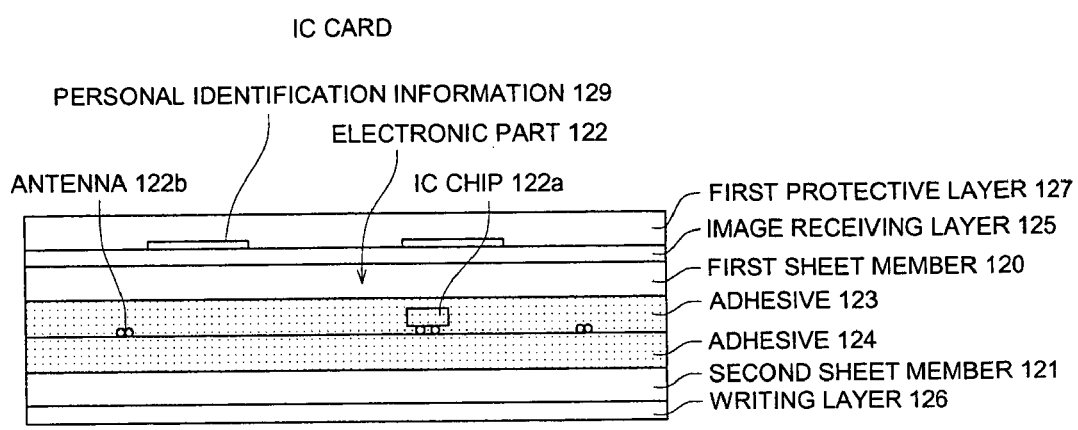
FIGS. 10(a) and 10(b) are layer configurations of an identification card (IC card).
Figure 10:
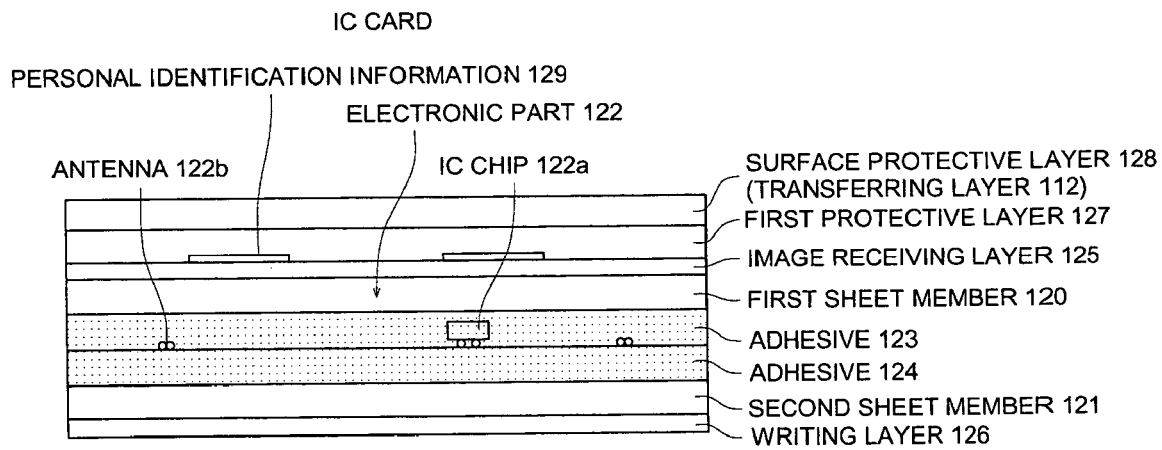

FIGS. 10(a) and 10(b) show a layer configuration of the IC card. The IC card in the embodiment shown in FIG. 10(a) is constituted in such a manner that electronic part 122 carrying an IC module comprised of IC chip 122a and antenna 122b is installed at the specified position between first sheet member 120 and second sheet member 121 and adhesives 123 and 124 are filled. Image receptive layer 125 is provided on first sheet member 120. Aforesaid image receptive layer 125 carries personal identification information 129 including a name and a facial image which are printed employing a sublimation thermal transfer and/or fusion thermal transfer system, an ink jet system, or a re-transfer system, and receives sublimation or thermally diffusible dye images formed by a thermal transfer recording method. First protective layer 127 may be provided on image receptive layer 125. Aforesaid personal identification information 129 refers to personal information such as a facial image, an address, a name, and a birth date, which is applied to facial image carrying cards with an image protective layer, which are required for anti-forgery as well as anti-falsification. Aforesaid second sheet member 121 carries writing layer 126.

In the IC card in the embodiment shown in FIG. 10(b), protective layer transfer foil 101 is used and the IC card is prepared by transferring surface protective layer 128 (transferring layer 112) comprised of a photo-cured resin layer onto first protective layer 127. Further, a cushioning layer may be provided between first sheet member 120 and image receptive layer 125 and between second sheet member 121 and writing layer 126.

As noted above, by employing card substrate 111 and protective layer transfer foil 101 specified for ID cards and IC cards and by transferring surface projective layer 111e or 128 (transferring layer 112) onto card substrate 111, it is possible to enhance lamination properties (adhesion properties) as well as scratch resistance. By maintaining the peeling charge amount at a low level during transfer, it is possible to prepare identification cards without degradation of external appearance due to adhesion of dust onto the card surface. Further, it is possible to minimize creation of apparatus bugs. Still further, it is possible to enhance lightfastness, adhesion between layers, and solvent resistance.

The structural elements, which can be preferably utilized in the present invention, will now be detailed.

(First Sheet Member and Second Sheet Member)

Examples of base materials for first sheet members as well as second sheet members include polyester resins such as polyethylene terephthalate, polybutylene terephthalate, and polyethylene terephthalate/isophthalate copolymers; polyolefin resins such as polyethylene, polypropylene, and polymethylpentane; polyethylene fluoride based resins such as polyvinyl fluoride, polyvinylidene fluoride, polyethylene tetrafluoride, and ethylene-ethylene tetrafluoride copolymers; polyamides such as nylon 6 and nylon 6,6; vinyl polymers such as polyvinyl chloride, vinyl chloride/vinyl acetate copolymers, ethylene/vinyl acetate copolymers, ethylene/vinyl alcohol copolymers, vinyl alcohol, and vinylon; biodegradable resins such as biodegradable aliphatic polyesters, biodegradable polycarbonates, biodegradable polyacetic acid, biodegradable vinyl alcohols, biodegradable cellulose acetates, and biodegradable polycaprolactones; cellulose based resins such as cellulose triacetate and cellophane; acryl based resins such as methyl polymethacrylate, ethyl polymethacrylate, ethyl polyacrylate, and butyl polyacrylate; synthetic resinous sheets comprised of polystyrene, polycarbonate, polyallylate, and polyimide; papers such as fine-quality paper, thin paper, glassine paper, parchment paper, and metal foils. These may be employed in a single layer or in the form of lamination of at least two layers. The thickness of the sheet members of the present invention is preferably 30–300 µm, and is more preferably 50–200 µm.

In the card substrate for ID card or the sheet member for the IC card, the first sheet member may be the same as the second sheet member, or the orientation angle thereof may be matched. In some cases, a plurality of different substrates or supports differing in the thickness may be laminated to prepare cards.

Further, the surface of the sheet members may be subjected to an adhesion enhancement treatment, which is achieved by employing coupling agents, latexes, and resinous layers comprised of hydrophilic resins. In some cases, the sheet member may be subjected to an adhesion enhancement treatment such as a corona treatment or a plasma treatment. Still further, in order to minimize thermal contraction, an annealing treatment may be performed. In order to further decrease the electrostatic charge of the card substrate during peeling of the transfer foil of the present invention, it is more preferable to provide an antistatic layer on the sheet member.

If desired, provided on the sheet member may be embossing, signatures, IC memory, light memory, a magnetic recording layer, a forgery and falsification thwarting printed layer (such as a pearl pigment layer, a watermark printed layer, or micro-letters), an embossed printing layer, or a IC chip shielding layer.

(Image Receptive Layer)

The image receptive layer can be formed by utilizing a first sheet member or a substrate for second sheet member, binder and additives.

The image receptive layer of the present invention is subjected to formation of gradation information containing images, employing a sublimation type thermal transfer system as well as formation of textual information containing images, employing either a sublimation type thermal transfer system or a fusion type thermal transfer system. Therefore, required is excellent dyeability for sublimation dyes as well as excellent adhesion property for thermally diffusible ink, along with dyeability for sublimation dyes. In order to provide such special properties to the image receptive layer, it is required, as described below, to appropriately select the type of binders and various additives and to adjust the blending amounts thereof.

Components which are used to form the image receptive layer will now be detailed.

Appropriately employed as binders for the image receptive layer in the present invention may be commonly known binders employed in a sublimation type thermal transfer recording image receptive layer. Examples include polyvinyl chloride resins, copolymers of vinyl chloride with other monomers (for example, isobutyl ether and vinyl propionate), polyester resins, poly(methacrylic) acid esters, polyvinylpyrrolidone, polyvinyl acetal based resins, polyvinyl butyral based resins, polyvinyl alcohols, polycarbonates, cellulose triacetate, polystyrene, copolymers of styrene with other monomers (for example, acrylic acid ester, acrylonitrile, and ethylene chloride), vinyltoluene acrylate resins, polyurethane resins, polyamide resins, urea resins, epoxy resins, phenoxy resins, polycaprolactone resins, polyacrylonitrile resins, and modified products thereof. Preferably employed as binders may be various resins such as polyvinyl chloride resins, copolymers of vinyl chloride with other monomers, polyester resins, polyvinyl acetal based resins, polyvinyl butyral based resins, copolymers of styrene with other monomers, epoxy resins, photocurable resins, and thermosetting resins.

However, when practical properties (such as specified heat resistance for issued ID cards) are required for the images formed by the present invention, it is necessary to determine the types or combinations of binders to achieve required characteristics. For example, when heat resistance at 60° C. or higher is required for images, it is preferable to use binders of a Tg of at least 60° C. upon considering bleeding of sublimation dyes.

In the present invention, when an image receptive layer is formed, it is preferable that metal ion containing compounds are incorporated. It is specifically preferable that heat transfer compounds react with the aforesaid metal ion containing compounds to form chelates.

Listed as metals which form ions incorporated into the aforesaid metal ion containing compounds are, for example, divalent and multivalent metals in Groups I–VIII of the Periodic Table. Of these, preferred are Al, Co, Cr, Cu, Fe, Mg, Mn, Mo, Ni, Sn, Ti, and Zn. Of these, particularly preferred are Ni, Cu, Co, Cr, and Zn. Preferred as compounds containing the aforesaid metal ions are inorganic or organic salts and complexes of the aforesaid metals. Specific examples of compounds, which are preferably employed, are complexes represented by the general formula below, which contain $Ni^{2+}$, $Cu^{2+}$, $Co^{2+}$, $Cr^{2+}$ or $Zn^{2+}$.

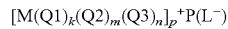

$$[M(Q1)_k(Q2)_m(Q3)_n]_p{}^+P(L^-)$$

wherein M represents a metal ion, Q1, Q2, and Q3 each represents a coordination compound capable of coordinating with the metal ion represented by M. These coordination compounds may be selected from those described, for example, in "Chelate Kagaku 5 (Chelate Chemistry 5), (Nankodo)". Listed as particularly preferred compounds may be coordination compounds having at least one amino group which coordinates with metal. Further, specific examples include ethylenediamine, glycinamide, and picolinamide and their derivatives.

L represents a counter anion capable of forming a complex and includes inorganic compound anions such as Cr, $SO_4$, or $ClO_4$ as well as organic compound anions such as benzenesulfonic acid derivatives and alkylsulfonic acid derivatives. Of these, particularly preferred are a tetraphenylboron anion and its derivatives as well as an alkylbenzenesulfonic acid anion and its derivatives. k represents an integer of 1, 2, or 3, and m represents 1, 2, or 0, while n represents 1 or 0. These are determined depending on the tetradentate or hexadentate of the complex represented by the aforesaid general formula, or by the number of ligands of Q1, Q2, and Q3. p represents 1, 2, or 3.

Listed as compounds containing these types of metal ions may be those exemplified in U.S. Pat. No. 4,987,049. The added amount of the aforesaid metal ion containing compounds is preferably 0.5–20 $g/m^2$ with respect to the image receptive layer, and is more preferably 1–15 $g/m^2$.

Further, it is preferable to incorporate releasing agents into the image receptive layer. Preferred as effective releasing agents are those, which are compatible with the used binders. Specific representative examples include modified silicone oil and modified silicone polymers such as amino modified silicone oil, epoxy modified silicone oil, polyester modified silicone oil, acryl modified silicone resins, and urethane modified silicone resins.

Of these, the polyester modified silicone oil not only minimizes melt adhesion to ink sheets but also is particularly excellent in that the secondary processability of the image receptive layer is not degraded. Secondary processability of the image receptive layer, as described herein, refers to writability of "Magic" or permanent ink and lamination property which causes problems when finished images are protected. Other than these, minute particles such as silica particles are also useful as a releasing agent. When secondary processability is on no concern, curable silicone compounds are effectively employed to minimize melt adhesion. UV curable silicone and reaction curable silicone are commercially available, from which marked releasing effects are possible.

The image receptive layer in the present invention is produced as follows, while employing a coating method. An image receptive layer liquid coating composition is prepared by dispersing or dissolving layer-forming components into or in solvents, and the resulting liquid coating composition is applied onto the surface of the aforesaid support and subsequently dried.

The thickness of the image forming layer formed on the support is preferably 1–50 μm, and is more preferably about 2–about 10 μm. In the present invention, either a cushioning layer or a barrier layer may be provided between the support and the image receptive layer. When a cushioning layer is provided, it is possible to transfer and record images corresponding to image information under desired reproduction and lower noise.

<Cushioning Layer>

Preferred as materials to form the cushioning layer are polyolefins. Suitable materials include polyethylene, polypropylene, ethylene-vinyl acetate copolymers, ethylene-ethyl acrylate copolymers, styrene-butadiene-styrene block copolymers, styrene-isobutylene-styrene block copolymers, styrene-ethylene-butadiene-styrene block copolymers, styrene-hydrogenated isoprene-styrene block copolymers, and polybutadiene, as well as a photocurable layer, which exhibit flexibility and lower thermal conductivity. Specifically, it is possible to use the cushioning layer described in Japanese Patent Application No. 2001-16934. Further, the present invention may be applied to either the first sheet member or the second sheet member and is not particularly limited.

<Writing Layer>

It is preferable that the second sheet member comprises a writing layer. The writing layer of the present invention is a layer capable of being written upon. It is possible to form such a writing layer by incorporating minute inorganic powder such as calcium carbonate, talc, diatomaceous earth, titanium oxide, or barium sulfate into a film comprised of thermoplastic resins (polyolefins such as polyethylene, and various copolymers). It is also possible to form the writing layer employing the "writing-in layer" described in Japanese Patent Publication Open to Public Inspection No. 1-205155. The aforesaid writing layer is formed on the surface of a support on which a plurality of layers is not laminated.

<Information Carrier Comprised of Format Printing Layer>

It is preferable that an information carrier comprised of format printing is formed on the image receptive layer or the writing layer. The information carrier comprised of format printing, as described herein, refers to a information carrier provided with at least one of a plurality of recorded identification information and textual information and refers specifically to parallel ruling, a company name, a card name, restrictions, the telephone number of an card issuing company, etc.

The information carrier comprised of format printing is formed employing common inks such as photocurable ink, oil-soluble ink, solvent type ink, and ink comprised of carbon, described in "Heihan Insatsu Gijutsu (Lithographic Techniques)", "Shin Insatsu Gijutsu Gairon (New Introduction to Printing Techniques)", "Offset Insatsu Gijutsu (Offset Printing Techniques)", and "Seihan Insatsu Hayawakari Zukan (Pictorial Handbook of Plate Making and Printing)", all published by Nippon Insatsu Gijutsu Kyokai.

The format printing is performed on the image receptive layer or the writing layer, employing printing methods such as wash-off resin relief printing, lithographic printing, silk printing, or flexographic printing.

<Image Forming Method Applied to Image Recording Body>

On the card substrate prepared as above, provided are image elements such as a plurality of information carriers recorded with identification information as well as textual information or recorded with identification information as well as textual information employing another method on the printing surface side on the image recording body formed employing format printing, whereby it is possible to prepare ID cards as well as IC cards.

A facial image is commonly a full color image exhibiting gradation, which is prepared employing, for example, a sublimation type thermosensitive transfer recording system, or a silver halide color photographic system. Further, a textual information is comprised of a binary image which is prepared employing, for example, a fusion type thermosensitive transfer recording system, a sublimation type thermosensitive transfer recording system, a silver halide color photographic system, an electrophotographic system, an ink jet system, or a re-transfer system. In the present invention, it is preferable to record authentication images such as a facial image as well as attribute information images, employing a sublimation type thermosensitive transfer recording system.

The aforesaid attribute information includes name, address, birth date, license, etc., which are recorded as textual information while commonly employing a fusion type thermosensitive transfer recording method. Format printing or information recording may be carried out employing any of the methods such as offset printing, gravure printing, silk printing, screen printing, intaglio printing, letterpress printing, an ink jet system, a sublimation transfer system, an electrophotographic system, a thermal fusion system, and a re-transfer system. However, in the present invention, preferred are any of the sublimation transfer system, ink jet system, thermal fusion system, and re-transfer system.

<Sublimation Image Forming Method>

It is possible to constitute a sublimation type thermosensitive transfer recording ink sheet employing a support having thereon a sublimation dye-containing ink layer.

<Supports>

Supports are not particularly limited as long as they exhibit desired dimensional stability and are resistant to the heat during recording employing a thermosensitive head. It is possible to use conventional supports known in the art.

<Sublimation Dye-Containing Ink Layers>

The aforesaid sublimation dye containing ink layer basically comprises sublimation dyes as well as binders.

Listed as the aforesaid sublimation dyes may be cyan dyes, magenta dyes, and yellow dyes.

Listed as the aforesaid cyan dyes are naphthoquinone based dyes, anthraquinone based dyes, and azomethine based dyes, described in JP-A Nos. 59-78896, 59-227948, 60-24966, 60-53563, 60-130735, 60-132292, 60-239289, 61-19396, 61-22993, 61-31292, 61-31467, 61-35994, 61-49893, 61-148269, 62-191191, 63-91288, 63-91287, and 63-290793.

Listed as the aforesaid magenta dyes are anthraquinone based dyes, azo dyes, and azomethine based dyes described in JP-A Nos. 59-78896, 60-30392, 60-30394, 60-253595, 61-262190, 63-5992, 63-205288, 64-159, and 64-63194.

Listed as the aforesaid yellow dyes are methine based dyes, azo based dyes, quinophthalone based dyes, and anthraisothiazole based dyes described in JP-A Nos. 59-78896, 60-27504, 60-31560,60-53565, 61-12394, and 63-122594.

Further, particularly preferred sublimation dyes are azomethine dyes which are prepared through a coupling reaction of compounds having a closed chain type or closed chain type active methylene group with oxidized p-phenylenediamine derivatives or oxidized p-aminophenol derivatives, as well as indoaniline dyes prepared through a coupling reaction of phenol or naphthol derivatives with oxidized p-phenylenediamine derivatives or oxidized p-aminophenol derivatives.

Still further, when metal ion containing compounds are incorporated into the image receptive layer, it is preferable to incorporate into the sublimating dye containing ink layer, sublimating dyes which form chelates upon reacting with the aforesaid metal ion containing compounds. Listed as such sublimation dyes capable of forming chelates may be cyan dyes, magenta dyes, and yellow dyes capable of forming at least a bidentate chelate, described, for example, in JP-A Nos. 59-78893 and 59-109349, and Japanese Patent Application Nos. 2-213303, 2-214719, and 2-203742.

It is possible to represent preferred sublimation dyes capable of forming a chelate, employing the general formula below.

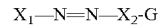

$$X_1\text{—}N\!=\!N\text{—}X_2\text{-}G$$

wherein $X_1$ represents a group of atoms necessary for completing an aromatic carbon ring or heterocyclic ring in which at least one ring is formed employing 5–7 atoms in which at least one atom adjacent to the carbon atom bonded to an azo bond is a carbon atom substituted with a nitrogen atom or a chelating group. $X_2$ represents an aromatic heterocyclic ring or aromatic carbon ring in which at least one ring is formed employing 5–7 atoms. G represents a chelating group.

With regard to any of the sublimation dyes, when images, which are desired to be formed, are comprised of a single color, the sublimation dye comprised in the aforesaid sublimation dye containing ink layer may be any of yellow dyes, magenta dyes, and cyan dyes. Alternatively, depending on the color tone of images to be formed, at least two of the aforesaid three dyes or other sublimation dyes may be combined. The used amount of the aforesaid sublimation dyes is customarily 1–20 g per m² of the support, and is preferably 0.2–5 g.

Binders of the ink layer are not particularly limited and conventional ones known in the art may be employed.

Further, various conventional additives known in the art may be incorporated into the aforesaid ink layer.

It is possible to prepare a sublimation type thermosensitive transfer recording ink sheet in such a manner that an ink layer forming liquid coating composition is prepared by dispersing or dissolving the aforesaid various components forming the ink layer into or in solvents, the resulting coating composition is applied onto a support, and subsequently dried. The thickness of the ink layer prepared as above is customarily 0.2–10 μm, and is preferably 0.3–3 μm.

<Ink Jet>

When an ink jet system is employed, in the case of, for example, a bubble jet system (registered trade mark), the required resolution is approximately 400 dpi. With regard to facial images, a multi-density level may be achieved employing a shearing mode. JP-A No. 9-71743 describes a method in which an aliphatic ester having an alkyl group of 18–36 carbon atoms is employed together with dimer acid base polyamide. JP-A No. 2000-44857 describes an ink prepared by dispersing a binder into a photocurable composition. It is possible to achieve production employing ink described in JP-A Nos. 9-71743, 2000-297237, 2000-85236, and 5-1254. Further, as a post-processing, after printing textual information as well as facial images, heating and post-exposure may be carried out. The types of ink and image forming methods are not particularly limited.

(Protective Layer Transfer Foil)

Listed as supports are, for example, synthetic resin sheets comprised of polyester resins such as polyethylene terephthalate, polybutylene terephthalate, and polyethylene terephthalate/isophthalate copolymers; polyolefin resins such as polyethylene, polypropylene, and polymethylpentane; polyethylene fluoride based resins such as polyvinyl fluoride, polyvinylidene fluoride, polyethylene tetrafluoride, and ethylene-ethylene tetrafluoride copolymers; polyamides such as nylon 6 and nylon 6.6; vinyl polymers such as polyvinyl chloride, vinyl chloride/vinyl acetate copolymers, ethylene/vinyl acetate copolymers, ethylene/vinyl alcohol copolymers, vinyl alcohol, and vinylon; cellulose based resins such as cellulose triacetate and cellophane; acryl based resins such as methyl polymethacrylate, ethyl polymethacrylate, ethyl polyacrylate, and butyl polyacrylate; polystyrene, polycarbonate, polyallylate, and polyimide; or papers such as fine-quality paper, thin paper, glassine paper, parchment paper, and metal foils. These may be employed in a single layer or in the form of lamination of at least two layers.

The thickness of supports of the protective layer transfer foil of the present invention is preferably 10–200 μm, and is more preferably 15–80 μm. When the thickness is at most 10 μm, problem can occur in which the support is damaged during transfer. Polyethylene terephthalate is preferably employed in the releasing layer specified by the present invention. If desired, the surface of supports may be subjected to irregularity. Listed as irregularity achieving means are kneading of matting agents, sand blasting, hairlining, matt coating, and chemical etching. Matt coating may be carried out employing either organic materials or inorganic materials. Employed as inorganic materials for matting are, for example, silica described in Swiss Patent No. 330,158, glass powder described in French Patent No. 1,296,995, and carbonates of alkaline earth metal, or cadmium and zinc described in British Patent No. 1,173,181. Employed as organic matting agents may be starch described in U.S. Pat. No. 2,322,037, starch derivatives described in Belgium Patent No. 625,451 and British Patent No. 981,198, polyvinyl alcohol described in Japanese Patent Publication No. 44-3643, polystyrene or polymethacrylate described in Swiss Patent 330,158, polyacrylonitrile described in U.S. Pat. No. 3,079,257, and polycarbonate described in U.S. Pat. No. 3,022,169. Matting agents may be dispersed into a liquid coating composition and coated. Alternatively, after coating a liquid coating composition, a matting agent may be sprayed onto the resulting coating prior to complete drying. When a plurality of types of matting agents is employed, the aforesaid methods may be used in combination. In the present invention, either a transfer surface or a back surface or both may be subjected to a roughening process.

In the present invention, it is preferable that in order to limit the maximum electrostatic charge of the peeling layer to at most 30 KV at the peeling step, an antistatic layer is preferably provided between the aforesaid transfer foil support and the photo-cured resin layer. In the present invention, the location of the aforesaid antistatic layer is not particularly restricted to control the charge amount of the peeling layer at the peeling step to at most 30 KV. However, the antistatic layer is located preferably in a layer near the support. More preferably, an antistatic agent is provided in the releasing layer. Further, the antistatic layer may be provided onto a support prior to or after matting, while no other particular limitations are imposed.

<Releasing Layer of the Protective Layer Transfer Foil>

It is preferable that the releasing layer used in the transfer foil of the present invention preferably comprises the antistatic agent. Preferably incorporated as antistatic agent is at least one of metal oxide particles, an electrically conductive powder, and an electrically conductive resin.

The releasing layer can be provided separately from the antistatic layer. In that case, the releasing layer may be a resin having a high glass transition temperature such as acrylic resin, polyvinylacetal resin and polyvinylbutyral resin, a kind of wax, a kind of silicone oil, a fluorine compound or a resin having water solubility such as polyvinyl pyrrolidone resin, polyvinylalcohol resin, Si-modified polyvinylalcohol resin, methylcellulose resin, hydroxycellulose resin, silicone resin, paraffin wax, acryl-modified silicone, polyethylene wax and ethylenic vinyl acetate. As others, poly dimethyl siloxane or modified that can be cited. For example, an oil or a resin such as polyester-modified silicone, acryl-modified silicone, urethane-modified silicone, alkyd-modified silicone, amino-modified silicone, epoxy-modified silicone, polyether-modified silicone or hardened them can be cited. As other fluorine compounds, such as fluorinated olefin, and perfluorophosphoric ester type compound can be cited. As preferably olefin type compounds, dispersion of polyethylene or polypropylene, and long-chained alkyl type compound such as polyethyleneimineoctadecyl can be cited. Among them, one, which has a poor solubility, can be used by dispersing.

In case the transferring is conducted 2 or more times, thermally-plastic elastomer can be incorporated to the releasing layer. As the thermally-plastic elastomer, such as styrene type (styrene block co-polymer (SBC)), olefin type (TP), urethane type (TPU), polyester type (TPEE), polyamide type (TPAE), 1,2-polybutadiene type, polyvinyl chloride type (TPVC), fluorine type, ionomer resin and chlorinated polyethylene can be cited. Concretely, they are described in such as [12996 no KAGAKUSYOUHIN] (KAGAKU KOUGYOU NIPPOU Co.).

The releasing layer preferably has a thickness of 0.000001 to 5.0 μm, more preferably 0.000001 to 3.0 μm, and still more preferably 0.00005 to 3.0 μm.

According to need, a thermally curable resin layer can be provided between the releasing layer and the photo-curable resin layer of the present invention. Concretely, such as polyester resin, acrylic resin, epoxy resin, xylene resin, guanamine resin, diarylphthalate resin, phenol resin, polyimide resin, maleic resin, melamine resin, urea resin, polyamide resin, and urethane resin can be cited.

<Metal Oxide Particles>

Listed as metal oxide particles are, for example, those which tend to form non-stoichiometric compounds such as oxygen insufficient oxides, metal excessive oxides, metal insufficient oxides, and oxygen excessive oxides. Of these, compounds which are most suitable for the present invention are metal oxide particles which can be produced employing various production methods.

Examples include particles of stannic oxide, zinc oxide, and titanium oxide. It is preferable to use minute non-crystalline stannic oxide particles at an electric conductivity of less than 105 Ω·cm. It is more preferable to use non-crystalline stannic oxide particles of a weight decrease ratio of 0.1–30 percent by weight in the range of 200–500° C. when employing common thermogravimetric analysis, in addition to the aforesaid electric conductivity. It is most preferable to use minute non-crystalline stannic oxide particles which comprise ions, especially anions of at least 0.001 percent by weight in the interior and the exterior such as the surface of minute particles in addition to the aforesaid characteristics. Listed as the aforesaid ions are, for example, captions such as ammonium ions or hydrogen ions, and anions such as ions containing a carboxylic acid group, a sulfonic acid group, an amino group, or a hydroxyl group, as well as carbonic acid ions and halogen ions. Production of such particles is detailed, for example, in JP-A No. 56-143430. Further, it is possible to use crystalline metal oxide particles disclosed in JP-A Nos. 56-143431, 7-77761, 20001-160326, and 10-142803, an amorphous stannic oxide sol disclosed in Examined Japanese Patent Publication No. 35-6616, amorphous vanadium pentaoxide disclosed in JP-A No. 55-5982, and an alumina sol having an electrolyte disclosed in Examined Japanese Patent Publication No. 57-12979.

Incidentally, the diameter of metal oxide particles employed in the present invention is preferably about 1–about 20 nm.

It is preferable that the aforesaid metal oxide particles are dispersed into hydrophilic solvents such as water or alcohol to form a sol. By employing hydrophilic solvents, especially water, it is possible to enhance compatibility with the environment. Dispersion methods are not particularly limited, but in order to assist sol formation during dispersion, other components, as well as additives such as a stabilizer, may be incorporated.

Listed as production methods of the electrically conductive sol employed in the present invention is a method in which, for example, when metal oxide particles are comprised of stannic oxide, a hydrolysable tin compound, or a hydrolysable tin compound together with a fluorine containing compound, is subjected to hydrolysis, the resulting product is washed and the halogen concentration is controlled to be 0.01–3 percent, and the resulting product is dissolved in ammonia water, followed by a thermal treatment. Incidentally, the thermal treatment is carried out preferably at no more than 450° C., more preferably at no more than 300° C., still more preferably at no more than 200° C., and most preferably at n more than 150° C. The thermal treatment is appropriately carried out in the range of 25–150° C. Listed as the aforesaid hydrolysable tin compounds may be oxo anion containing compounds such as $K_2SnO_3.3H_2O$, water-soluble halides such as $SnCl_4$, and $SnCl_4.5H_2O$, compounds exhibiting the structure of $R'_2SnR_2$ and $R_3SnX$, and $R_2SnX_2$ (wherein R' and R each represents an aliphatic or aromatic organic compound and X represents a halogen) such as organic metal compounds, for example, $(CH_3)_3SnCl.(pyridine)$ and $(C_4H_9)_2Sn(O_2CC_2H_5)_2$, and oxo salts such as $Sn(SO_4)_2.2H_2O$. Further, when the electrically conductive sol is produced employing the foresaid hydrolysable compounds, hydrophilic solvent-soluble compounds containing other atoms, such as fluorine compounds and carbonates, may be added.

The aforesaid sol is preferably comprised of one or at least two sols selected from the group consisting of a water based non-crystalline stannic oxide sol employing water as a solvent, a water based antimonic acid zinc oxide sol, a water based fluorine doped non-crystalline stannic oxide sol, a water based antimonic acid titanium oxide sol, and a water based antimonic acid stannic oxide sol. The water based non-crystalline stannic oxide sol is particularly preferably employed. The water based non-crystalline stannic oxide sol, which does not comprise antimony, is particularly preferred because sublimation of antimony is minimized.

Binder resins, which are blended with the aforesaid sol, are not particularly limited and may be selected depending on adhesion to substrates employed for coating and physical properties of the desired electrically conductive layer. For example, hydrophilic binders such as gelatin or polyvinyl alcohol may be employed. Alternatively, employed may be thermoplastic resins as well as thermoplastic elastomers such as polyvinyl chloride, polyvinyl acetate, nitrocellulose, polyurethane, acrylic resins, epoxy group containing acrylic acid resins, or urethane acrylate resins together with organic solvents. Further, these may be employed in the form of a water dispersion.

Still further, along with these binders, employed may be hardening agents. Along with binder resins, a resinous composition which is prepared by mixing an electrically conductive sol prepared by dispersion minute metal oxide particles into hydrophilic solvents is applied onto the aforesaid substrate, and subsequently dried to evaporate solvents, whereby a layer is formed. An electrically conductive sol is prepared employing minute metal oxide particles and the resulting sol is mixed with binder resins. By such action, it becomes possible to disperse particles of smaller diameter into an electrically conductive layer, whereby electric conductivity, transparency, further adhesion of the electrically conductive layer to the substrate, uniformity, surface smoothness, and layer thickness controllability are enhanced. The particle size of employed inorganic metal oxides is not particularly limited, but is preferably 1 μm or less.

Methods for blending the aforesaid electrically conductive sol with binder resins and blending proportions are not particularly limited as long as they remain in the range which adversely affect the effects of the present invention. Further, during blending of the electrically conductive sol with binder resins, added may be additives such as neutralizing agents such as amine compounds, ammonia, and caustic soda, pH moderators, and surfactants. Methods for applying the resinous composition prepared by blending the electrically conductive sol with binder resins onto a substrate are not particularly limited, but commonly employed methods such as roll coating, air knife coating, blade coating, rod coating, or bar coating may be employed. After applying the resinous composition onto the substrate, the resulting coating is dried employing an oven or a dryer to evaporate solvents. Thus an electrically conductive layer is formed.

The coating amount of the metal oxide containing releasing layer is not particularly limited, but is preferably more than 0 to 3.00 g/m$^2$, more preferably 0.000005–2.00 g/m$^2$, and still more preferably 0.00001–2.00 g/m$^2$. When the amount of the aforesaid releasing layer is more than 2.00 g/m$^2$, problems may occur in which burrs tend to be formed due to a decrease in peeling force of the transfer foil and as a result, foreign matter tends to be formed in the apparatus.

<Antistatic Layer Comprised of Electrically Conductive Powders or Electrically Conductive Resins>

<Electrically Conductive Powders>

Electrically conductive powders include powders doped with metals of different atomic valence such as antimony, aluminum or boron, employing tin oxide as a main component; powders which are prepared by coating the aforesaid composition onto nucleolus materials such as mica powder, potassium titanate, or silica powder; zinc antimonite, indium oxide tin, gold, and silver, copper; carbon black and acetylene black; and organic electrolyte based surfactants.

<Electrically Conductive Resins>

Electrically conductive resins are not particularly limited and include any of the anionic, cationic, amphoteric, or nonionic resins. Of these, preferred are anionic and cationic resins. Of anionic resins more preferred are sulfonic acid based or carboxylic acid based polymers or latexes, while of cationic resins more preferred are tertiary amine based or quaternary ammonium based polymers or latexes.

Listed as these electrically conductive resins are, for example, anionic polymers or latexes described in Examined Japanese Patent Publication No. 52-25251 and JP-A No. 51-19923, and Examined Japanese Patent Publication No. 60-48024; cationic polymers or latexes described in Examined Japanese Patent Publication Nos. 57-18176, 57-56059, and 58-56856 and U.S. Pat. No. 4,118,231; and further polypyrroles, polythiophenes, polyaniline, polyphenylene vinylene, polyparaphenylene, and polymethaphenylene described in JP-A No. 2000-191971.

These electrically conductive powders and electrically conductive resins may be employed individually but may also be coated together with other binders. Employed as binders may be acryl based thermoplastic resins, photocurable curing resins, thermosetting resins, polyurethane, polyester, polyvinyl butyral, polyvinyl acetal, polycarbonate, polystyrene, and polypropylene. Further, along with these binders, employed may be hardening agents.

The coated amount of releasing layers containing electrically conductive powders and electrically conductive resins is not particularly limited, but is preferably more than 0 to 3.00 g/m$^2$, is more preferably 0.000005–2.00 g/m$^2$, and is still more preferably 0.00001–2.00 g/m$^2$.

When binders are employed, the ratio of the electrically conductive powders or electrically conductive resins to the binders is preferably 99:1–1:99 in terms of weight ratio, is more preferably 80:20–5:95, and is still more preferably 70:30–5:95.

The antistatic layer may be provided using commonly employed coating methods such as roll coating, air knife coating, blade coating, rod coating, and bar coating, while employing common organic solvents or water. After applying a resinous composition onto the substrate, the resulting coating is dried employing an oven or a dryer to evaporate solvents. Thus an electrically conductive layer is formed.

When printing is conducted employing these, in practice, it is possible to employ a gravure printing method, a screen printing method or an offset printing method. Printing methods are selected depending on the thickness of the film and the necessary thickness of the printing layer to be formed on the film. For example, when greater layer thickness is required, the screen printing method is suitable, while when lower layer thickness is required, the gravure printing method or the offset printing method is more suitable. When printing inks are employed, it is possible to use conventional electrically conductive inks, known in the art, which include electrically conductive inks described, for example, in JP-A Nos. 9-59553, 7-57545, and 2000-19171.

Further, when desired, a thermally curable resin layer may be provided between the releasing layer and the cured layer. In some cases, any one of the aforesaid minute metal oxide particles, an electrically conductive powder or an electrically conductive resin may be incorporated into the thermosetting resinous layer. Binders are not particularly limited as long as a practical thermosetting resinous layer is formed. Specific examples of binders include polyester resins, acrylic resins, epoxy resins, xylene resins, guanamine resins, diallyl phthalate resins, phenol resins, polyimide resins, maleic acid resins, melamine resins, urea resins, polyamide resins, and urethane resins. When at least one of minute metal oxide particles, an electrically conductive powder, and an electrically conductive resin is incorporated into the aforesaid thermosetting resinous layer, antistatic agents may not be incorporated into the releasing layer adjacent to the support, and a releasing layer may be employed which is used for a transfer foil comprising Ultraviolet absorbents described below.

When an antistatic layer is not provided between the support and the photo-cured resin layer, problems may occur in which the maximum electrostatic charge of the peeling layer at the peeling step exceeds 30 KV of the peeling layer, and as a result, apparatus bugs may be generated to degrade workability and dust may be adhered onto the card.

In the present invention, when the transfer foil is further laminated employing any one of metal oxide particles, electrically conductive powder, or electrically conductive resin, it was confirmed that the resulting adhesion property was improved compared to the two conventional transfer foils. Further, when a plurality of transfer foils is employed, it is possible to minimize dust adhesion as well as apparatus bugs by providing the antistatic layer with any one of the transfer foils.

(Photo-cured Resin Layer)

A layer configuration is preferably achieved in which the photo-cured resin layer is provided adjacent to the releasing layer. In order to prepare the photo-cured resin layer, it is possible to employ photo curable resins such as an actinic light curable resin. The actinic light curable resins are subjected to addition polymerization or ring-opening polymerization. Addition polymerizable compounds, as described herein, refer to radically polymerizable compounds such as photocurable materials employing photopolymerizable compositions described, for example, in JP-A Nos. 7-159983, Examined Japanese Patent Publication No. 7-31399, JP-A Nos. 8-224982, 10-863 and Japanese Patent Application No. 7-231444. Known as addition polymerizable compounds are cationic polymerization based photocurable resins. Recently, for example, JP-A Nos. 6-43633 and 8-324137 have disclosed cationic photopolymerization based photocurable resins sensitized in a longer wavelength range than visible light. Radically polymerizable compounds include common photopolymerizable compounds as well as thermopolymerizable compounds. The radically polymerizable compounds refer to compounds having a radically polymerizable ethylenic unsaturated bond and include any compounds which have at least one radically polymerizable ethylenic unsaturated bond in the molecule, which include those in the chemical structure of an monomer, an oligomer and a polymer. Radically polymerizable compounds may be employed individually or in combinations of at least two types under optional ratios to enhance desired characteristics.

Examples of compounds having a radically polymerizable ethylenic unsaturated bond include unsaturated carboxylic acids such as acrylic acid, methacrylic acid, itaconic acid, crotonic acid, isocrotonic acid, and maleic acid and salts thereof, and radically polymerizable compounds such as esters, urethane, amide and anhydrides, acrylonitrile, styrene, further various unsaturated polyesters, unsaturated polyethers, unsaturated polyamides, and unsaturated urethanes. Listed as specific compounds are acrylic acid derivatives such as 2-ethylhexyl acrylate, 2-hydoxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetra acrylate, trimethylolpropane triacrylate, tetramethylolmethane tetraacrylate, oligoester acrylate, N-methylolacrylamide, diacetone acrylamide, or epoxyacrylate; methacrylate derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, propylene glycol dimethacrylate, trimethylolethane trimethacrylate, trimethylolpropne trimethacrylate, or 2,2-bis (4-methacryloxypolyethoxyphenyl)propane; and derivatives of allyl compounds such as allyl glycidyl ether, diallyl phthalate, or triallyl trimeritate. More specifically, it is possible to use commercially available products described in "Kakyozai Handbook (Handbook of Crosslinking Agents)", edited by Shinzo Yamashita (1981, Taisei Sha), "UV•EB Koka Handbook (Genryo Hen) (UV•EB Curing Handbook (Raw Materials Part)", edited by Kiyoshi Kato, (1985, Kobunshi Kankokai), "UV•EB Koka Gijutsu no Oyo to Shijo (Application UV•EB Technology and Market)", edited by Radotech Kenkyukai, page 79 (1989, C.M.C.), Eiichiro Takiyama, and "Polyester Jushi Handbook (Handbook of Polyester Resins)", (1988, Nikkan Kogyo Shinbunsha, as well as radically polymerizable or crosslinkable monomers, oligomers and polymers which are known in the industry.

The added amount of the aforesaid radically polymerizable compounds in the radically polymerizable composition is preferably 1–97 percent by weight, and is more preferably 30–95 percent by weight. Of these, particularly preferred are compounds which exhibit excellent stability at normal temperature, a high decomposition rate when heated and become colorless when decomposed. Listed as such compounds are benzoyl peroxide and 2,2'-azobisisobutyronitrile. Further, in the present invention, these thermopolymerization initiators may be employed individually or in combinations of at least two types. Further, the amount of thermopolymerization initiators in the thermopolymerizable composition is preferably in the range of 0.1–30 percent by weight, and is more preferably in the range of 0.5–20 percent by weight. Listed as cationic polymerization based photocurable resins may be epoxy type UV curable prepolymers of such a type (mainly an epoxy type) that polymerization is induced by cationic polymerization and prepolymers having at least two epoxy groups in one molecule. Listed as such prepolymers may be, for example, alicyclic polyepoxides, polyglycidyl esters of polybasic acids, polyglycidyl ethers of polyhydric alcohols, polyglycidyl ethers of polyoxyalkylene glycols, polyglycidyl ethers of aromatic polyols, hydrogenated compounds of polyglycidyl ethers of aromatic polyols, urethane polyepoxy compounds, and polyoxylated butadienes. These prepolymers may be employed individually or in combinations of at least two types. The content of prepolymers having at least two epoxy groups in one molecule in a UV curable protective layer forming coating composition is preferably at least 70 percent by weight. Other than above, listed as cationically polymerizable compounds incorporated into the cationically polymerizable composition may be, for example, (1) styrene derivatives, (2) vinylnaphthalene derivatives, (3) vinyl ethers, and (4) N-vinyl compounds, as described below.

(1) Styrene Derivatives:

for example, styrene, p-methylstyrene, p-methoxystyrene, β-methylstyrene, p-methyl-β-methylstyrene, α-methylstyrene, and p-methoxy-β-methylstyrene (2) Vinylnaphthalene Derivatives:

for example, 1-vinylnaphthalene, α-methyl-1-vinylnaphthalene, β-methyl-1-vinylnaphthalene, 4-methyl-1-vinylnaphthalene, and 4-methopxy-1-vinylnaphthalene (3) Vinyl Ethers:

for example, isobutyl vinyl ether, ethyl vinyl ether, phenyl vinyl ether, p-methylphenyl vinyl ether, p-methoxyphenyl vinyl ether, α-methylphenyl vinyl ether, β-methylisobutyl vinyl ether, and β-chloroisobutyl vinyl ether (4) N-Vinyl Compounds:

for example, N-vinylcarbazole, N-vinylpyrrolidone, N-vinylindole, N-vinylpyrrole, N-vinylphenothiazine, N-vinylacetoanilide, N-vinylethylacetoamide, N-vinylsuccineimide, N-vinylphthalimide, N-vinylcaprolactam, and N-vinylimidazole The proportion of the aforesaid cationically polymerizable compounds in the cationically polymerizable composition is preferably 1–97 percent by weight, and is more preferably 30–95 percent by weight Listed as initiators of cationic polymerization based photocurable resins are aromatic onium salts. Listed as such aromatic onium salts may be salts of elements of Group Va of the Periodic Table such as phosphonium salts (e.g., hexafluorophosphoric acid triphenylphenacylphosphonium), salts of elements of Group VIa such as sulfonium salts (e.g., tetrafluoroboric acid triphenylsulfonium, hexafluorophosphoric acid triphenylsulfonium, hexafluorophosphoric acid tris(4-thiomethoxyphenyl), sulfonium and hexafluoroantimonic acid triphenylsulfonium), and salts of elements of Group VIIa such as iodonium salts (e.g., diphenyliodonium chloride).

The use of such aromatic onium salts as a cationic polymerization initiator during polymerization of epoxy compounds is detailed in U.S. Pat. Nos. 4,058,401, 4,069,055, 4,101,513, and 4,161,478. Listed as preferred cationic polymerization initiators are sulfonium salts of elements of Group VIa. Of these, from the viewpoint of UV curability and storage stability of UV curable compositions, preferred is hexafluoroantimonic acid triarylsulfonium. Further, it is optional to use prior art photopolymerization initiators described on pages 39–56 of Photopolymer Handbook (edited by Photopolymer Konwakai, published by Kogyo Chosa Kai, 1989), as well as compounds described in JP-A Nos. 64-13142 and 2-4804. If desired, it is possible to incorporate Ultraviolet absorbents, sensitizers, polymerization promoters, chain transfer agents, and polymerization inhibitors into the actinic radiation curable resinous layer. Further, Ultraviolet absorbents, photo stabilizers, and antioxidants described below may be added in any amount range which does not degrade curability.

In the case of the present invention, by incorporating ultraviolet absorbents, photo stabilizers, antioxidants, etc. into the photocurable resin layer, mechanical strength as well as chemical resistance is degraded due to the decrease in the degree of polymerization of the photocurable resin layer. Therefore, it is preferable that those additives are incorporated into an intermediate layer or/and an adhesive layer comprised of polyvinylbutyral resin or polybutyral, adjacent to the photocurable resinous layer.

The coated amount of the photo-cured resin layer is preferably 3.0–15 g/m$^2$, is more preferably 3.0–13 g/m$^2$, and is most preferably 5.0–13 g/m$^2$. When the weight is at most 3.0 g/m$^2$, problems can occur due to a decrease in scratch resistance. On the other hand, when the weight exceeds 15 g/m$^2$, scratch resistance is improved but other problems can occur in which the amount of foreign matter in the apparatus increases due to the tendency of burrs formed by variation of peeling force after transfer to the card even if the antistatic layer is provided.

The aforesaid cured layer may be cured employing any of the methods such as curing during production. Employed as actinic radiation sources may be any sources, which generate active electromagnetic waves to polymerization initiators. Examples include lasers, light emitting diodes, xenon flash lamps, halogen lamps, carbon arc lamps, metal halide lamps, tungsten lamps, mercury lamps, and electrodeless light sources. Of these, listed as preferred ones are xenon lamps, halogen lamps, carbon arc lamps, metal halide lamps, tungsten lamps, and mercury lamps. Applied radiation energy is suitably determined and employed depending on the types of initiators while controlling the exposure distance, the time and the intensity. In some cases, in order to enhance the polymerization rate, actinic radiation may be exposed under the absence of air in such a manner that air is replaced with nitrogen or ambient air pressure is reduced. When a laser is employed as a radiation source, it is possible to easily decrease the exposed area to a very small size, whereby it becomes possible to form images of high resolution. Appropriately employed as laser beam sources may be any of argon lasers, He-Ne gas lasers, YAG lasers, and semiconductor lasers.

The transfer foil provided with an antistatic layer of the present invention preferably comprises at least a releasing layer, a photo-cured resin layer and is more preferably provided with an intermediate layer, a barrier layer, a hologram layer, and an optically variable element layer, other than the aforesaid primer layer, and an adhesive layer. However, no particular limitations are imposed.

It is preferable that the intermediate layer of the transfer foil is comprised of at least one intermediate layer. In some cases, a primer layer and a barrier layer may be provided, whereby adhesion between layers may be further enhanced.

It is preferable that the transfer foil provided with an antistatic layer of the present invention comprises an intermediate layer or/and an adhesive layer comprised of polyvinyl butyral resin or butyral and being adjacent to the photo-cured resin layer, and comprises ultraviolet absorbents in the intermediate layer or/and the adhesive layer. Other than the intermediate layer(s), in order to achieve optimal adhesion, provided may be a barrier layer, a hologram layer, an optically variable element layer, and a primer layer, even though no limitations are imposed.

It is preferable that the intermediate layer of the transfer foil is comprised of at least one intermediate layer. In some cases, the intermediate layer may be provided as a primer layer or a barrier layer to further enhance adhesion between layers. It is preferable that in order to enhance the lightfastness of images, the intermediate layer used in the present invention comprises at least one of the compounds selected from ultraviolet absorbents, antioxidants, and photo stabilizers.

Employed as ultraviolet absorbents may be those which function to protect dye images from ultraviolet radiation and are capable of being thermally transferred. It is possible to use, for example, compounds described in JP-A Nos. 59-158287, 63-74686, 63-145089, 59-196202, 62-220594, 63-122596, 61-283595, and 1-204788, as well as prior art compounds known as compounds which enhance image durability of photographic materials and other image recording materials. Specifically, listed are salicylic acid based, benzophenone based, benzotriazole based, and cyanoacrylate based compounds. It is possible to use, for example, compounds under trade names such as Tinuvin P, Tinuvin 123, 234, 320, 326, 327, 328, 312, 315, 382, and 400 (all manufactured by Ciba-Geigy Corp.), Sumisorb-110, 130, 140, 200, 250, 300, 320, 340, 350, and 400 (all manufactured by Sumitomo Chemical Co;., Ltd.), and Mark La-32, 36, and 1413 (all manufactured by Adeka Ardes Kagaku Co., Ltd.). Further, it is possible to employ minute inorganic particles and ultra-minute metal oxide particle powder dispersing agents which exhibit absorption in the ultraviolet region. Listed as minute inorganic particles are titanium oxide, zinc oxide, and silicon compounds. Listed as ultra-minute metal oxide particle powder dispersing agents are those prepared by employing ultra-minute zinc oxide particle powder or ultra-minute titanium oxide particle powder together with water, alcohol mixed compositions, or various oil-soluble dispersion medium and dispersing agents such as surfactants, water-soluble polymers or solvent-soluble polymers.

Listed as antioxidants may be those described in JP-A Nos. 59-182785, 60-130735, and 1-127387, and compounds which enhance image durability in photographic materials and other image recording materials, as well as other compounds known in the art. Specifically listed are phenol based, monophenol based, bisphenol based, and amine based primary antioxidants or sulfur based and phosphor based secondary antioxidants. It is possible to use, for example, compounds under the trade names such as Sumilizer BBM-S, BHT, BP-76, MDP-S, GM, WX-R, BP-179, GA, TPM, TP-D, and TNP (all manufactured by Sumitomo Chemical Co., Ltd.), Irganox-245, 259, 1010, 1035, 1076, 1081, 1098, and 3114 (all manufactured by Ciba-Geigy Corp.), and Mark AQ-20, AO-30, and AO-40 (all manufactured by Adeka Ardes Kagaku Co., Ltd.).

Listed as photo stabilizers may be the compounds described in JP-A Nos. 259-158287, 63-74686, 63-145089, 59-196292, 62-229594, 63-122596, 283595, 1-204788, other prior art compounds which enhance image durability of photographic materials as well as other image recording materials. Specifically listed are hindered amine based compounds. It is possible to use compounds under the trade names such as Tinuvin 622LD, 144 and Chmassob 944 Ld (all manufactured by Ciba-Geigy Corp.), Sanol Ls-770, LS-765, Ls-292, LS-2626, LS-114, and LS-774 (all manufactured by Sankyo Corp.), and Mark LA-62, LA-67, LA-63, L-68, La-82, and LA-87 (all manufactured by Adeka Ardes Kagaku Co., Ltd.).

Other than the aforesaid ultraviolet absorbents, antioxidants, and photo stabilizers, it is possible to use binders. In the present invention, it is particularly preferable to use polyvinyl butyral resins or polyvinyl butyral in the intermediate layer to achieve desired adhesion to the photo-cured resin layer. Together with these, listed are, for example, thermoplastic resins such as vinyl chloride based resins, polyester based resins, acryl based resins, polyvinyl acetal based resins, polyvinyl alcohol, polycarbonate, cellulose based resins, styrene based resins, urethane based resins, urethane acrylate resins, amide based resins, urea based resins, epoxy resins, phenoxy resins, polycaprolactone resins, and polyacrylonitrile resins; thermoplastic elastomers such as styrene based (styrene-block-copolymer (SBC)), olefin based (TP), urethane based (TPU), polyester based (TPEE), polyamide based (TPAE), 1.2-polybutadiene based, vinyl chloride based (TPVC), and fluorine based; ionomer resins, chlorine based polyethylene, or silicone based. Specifically, it is possible to use SEBS resins and SEPS resins and modified products thereof, described in 1996 Edition "12996 no Kagaku Shohin (12996 Commercially Available Chemicals)" (Kagaku Kogyo Nipposha). These resins may be employed individually or in combinations of at least two types. Preferred as specific compounds are thermoplastic resins comprised of block polymers of polystyrene and polyolefin, and polyvinyl butyral. Commercially available polyvinyl butyral resins of the present invention include S-lec BH-3, BX-1, BX-2, BX-5, BX-55, BH-S, and BL-S, all manufactured by Sekisui Chemical Co., Ltd., as well as Denka Butyral #4000-2, #5000-A, and #6000-EP, all manufactured by Denki Kagaku Kogyo K.K. Prior to thermosetting, the degree of polymerization of thermosetting resins such as polybutyral in the intermediate layer is not limited. In order to enhance layer strength, added may be thermosetting compounds. Specifically employed may be isocyanate curing agents as well as epoxy curing agents. Thermosetting conditions are preferably 50–90° C. and 1–24 hours.

The added amount of ultraviolet absorbents, antioxidants, and photo stabilizers is preferably 0.05–20 percent by weight with respect to 100 percent weight of the binders, and is more preferably 0.05–10 percent by weight. The thickness of the intermediate layer comprising ultraviolet absorbents, antioxidants, and photo stabilizers is preferably 0.05–15.0 g/m$^2$, is more preferably 0.05–10.0 g/m$^2$, and is still more preferably 0.1–10.0 g/m$^2$.

Listed as the aforesaid thermal adhesion resins employed in the adhesive layer of the transfer foil are ethylene vinyl acetate resins, ethylene ethyl acrylate resins, ethylene acrylic acid resins, ionomer resins, polybutadiene resins, acrylic resins, polystyrene resins, polyester resins, olefin resins, urethane resins and adhesion providing agents (e.g., phenol resins, rosin resins, terpene resins, and petroleum resins). Copolymers or mixtures thereof may also be employed.

Commercially available urethane modified ethylene ethyl acrylate copolymers include Hitech S-6254, S-6354B, and S-3129, manufactured by Toho Chemical Industry Company Limited. Commercially available polyacrylic acid ester copolymers include Jurymer AT-210, AT-510, and AT-613, manufactured by Nihon Junyaku Co., Ltd. and Plus Size L-201, SR-102, SR-103, and J-4, manufactured by Goo Chemical Co., Ltd. The weight ratio of urethane modified ethylene ethyl acrylate copolymers to polyacrylic acid ester copolymers is preferably 9:1–2:8, while the thickness of the adhesive layer is preferably 0.1–100 µm. Further, the aforesaid Ultraviolet absorbents, antioxidants, and photo stabilizers may be incorporated into the aforesaid layer. "Methods for providing a protective layer transfer foil with an antistatic layer onto an image recording medium"

<Transfer Method>

Figure 9:
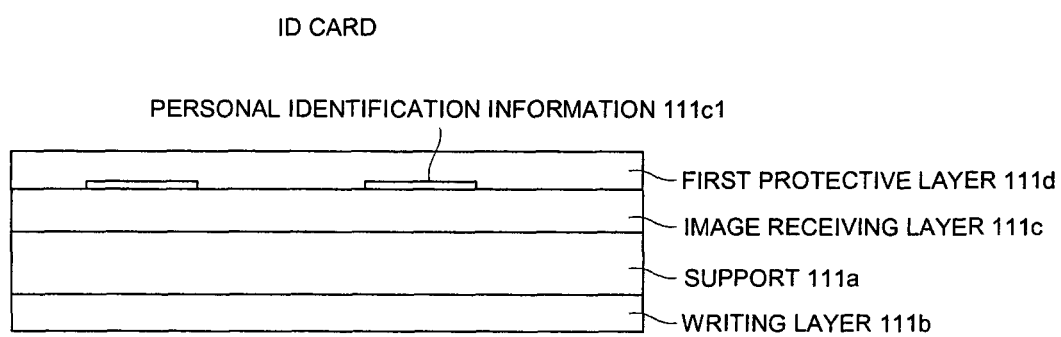
FIGS. 9(a) and 9(b) are layer configurations of an identification card (also referred to as an ID card).
Figure 9:
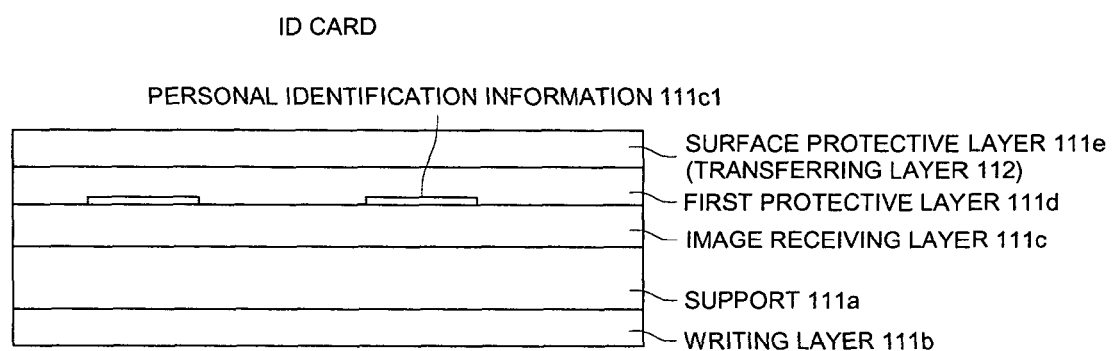

Transfer of a transfer foil onto a transferring material is customarily carried out employing an apparatus in which pressure is applied employing a heated thermal head, heating roller, or hot stamping machine. Specifically, when a hot stamping machine is used, it is possible to achieve transfer, employing a 5 cm diameter heating roller of a rubber hardness of 85 under a pressure of 50–500 kg/cm$^2$ during a heating period of 0.5–10 seconds, while the roller surface is heated to 150–300° C. Further, peeling angle q, which is shown in FIG. 9, is preferably 1 to 120 degree, and is more preferably 1 to 100 degree.

Figure 17:
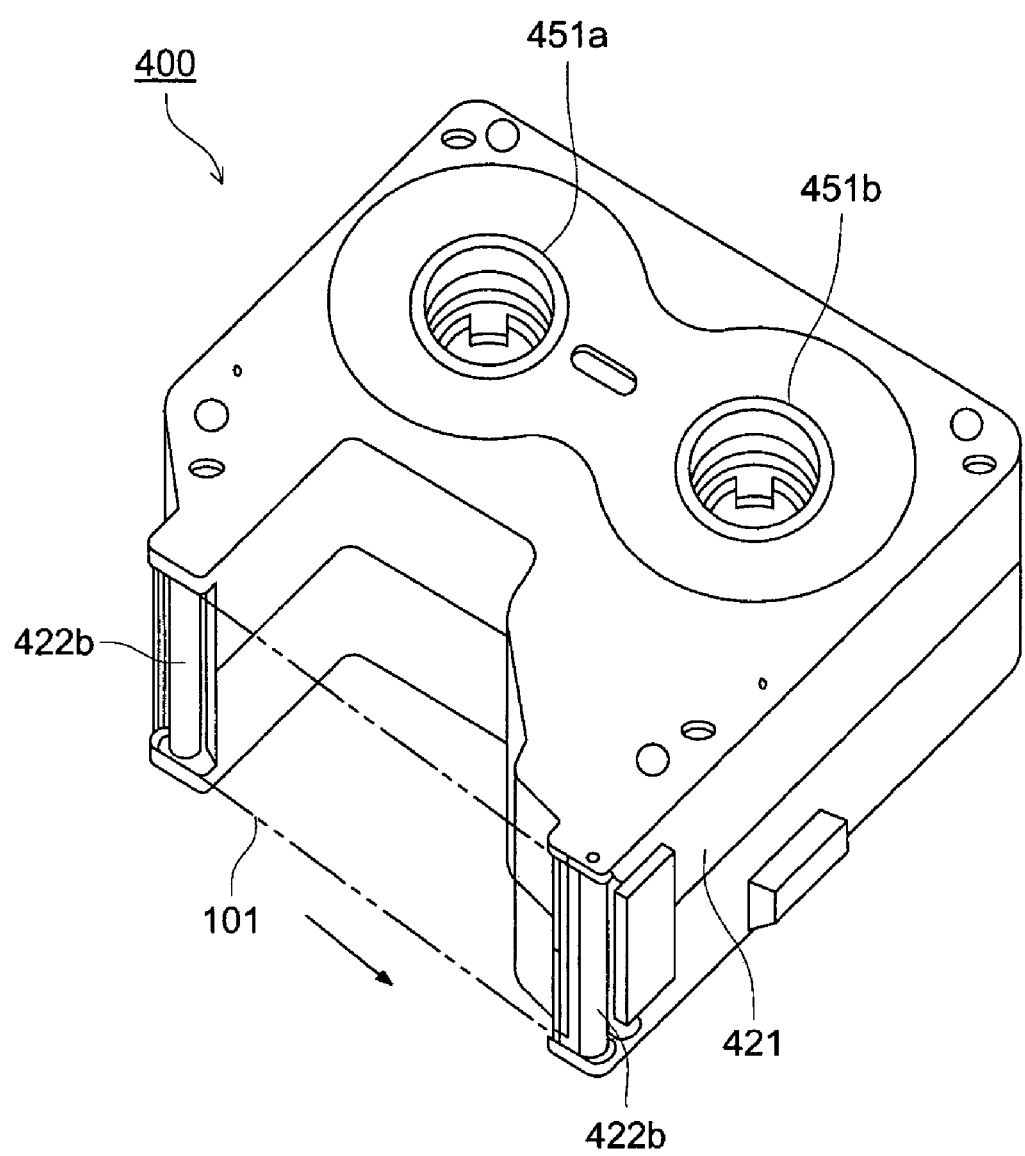
FIG. 17 is a perspective view of a protective layer transfer cartridge.
Figure 18:
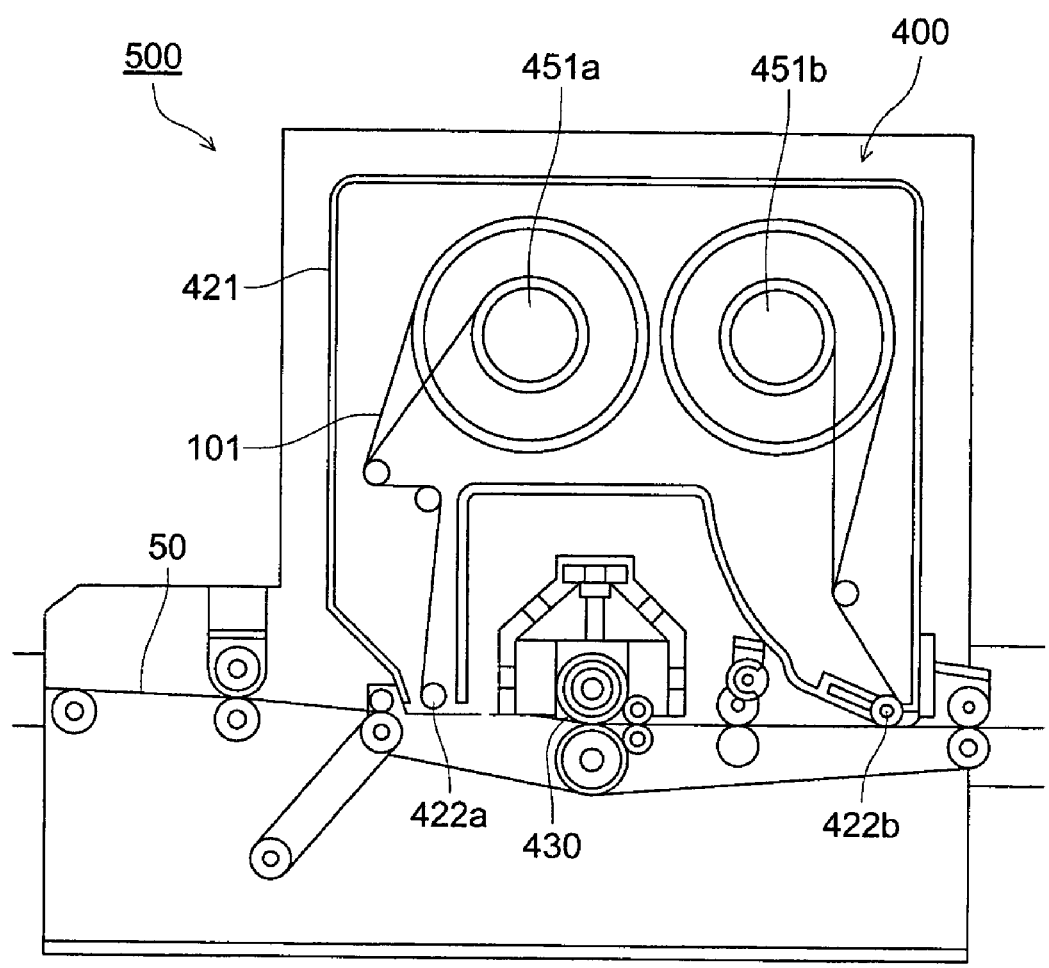
FIG. 18 is a structural view of a hot stamping apparatus.

As for specific examples in use of the present invention, FIG. 17 shows a cartridge for transfer, while FIG. 18 shows a hot stamping apparatus.

Figure 19:
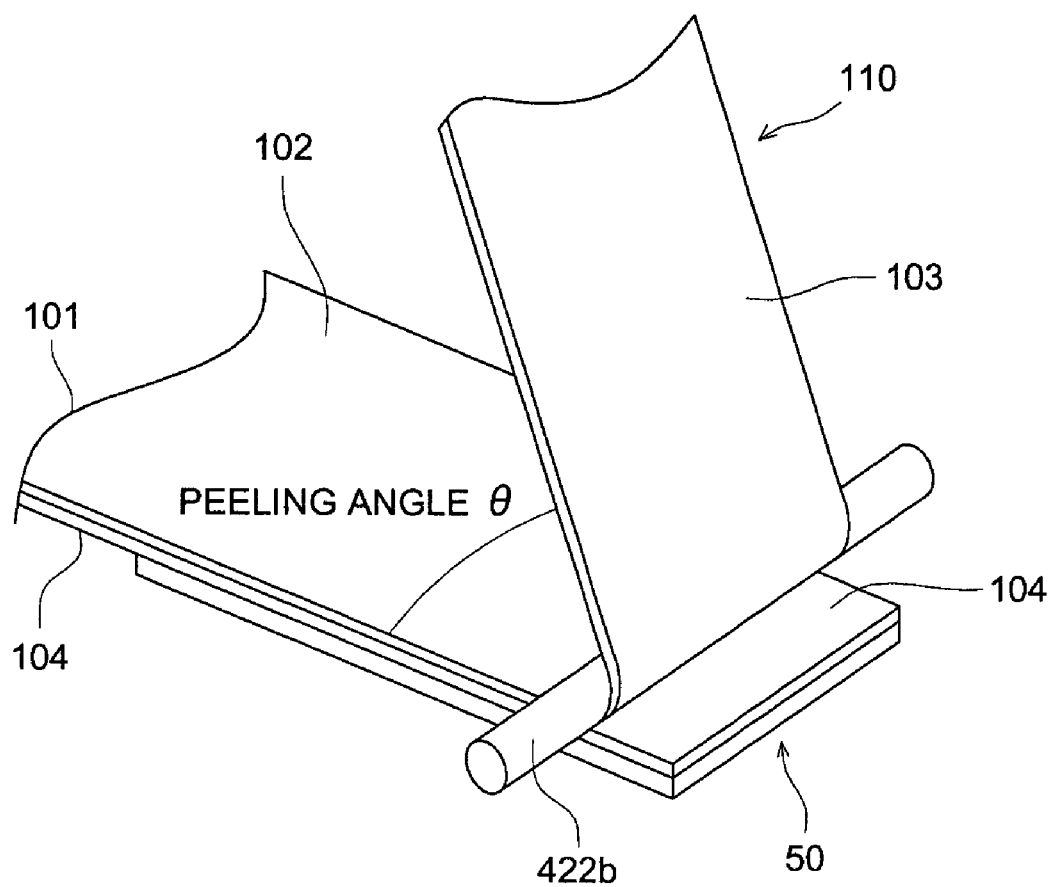
FIG. 19 is a view showing the transferring (peeling) state.

FIG. 19 is a schematic view showing peeling step of a peeling layer from a card, on which a transferring layer is transferred. Measured as the peeling electrostatic charge of the present invention were 1) the maximum electrostatic charge of the peeling layer at the peeling step, and 2) the maximum electrostatic charge of the card at the peeling step. The peeling layer of the transfer foil and the card at the peeling step were measured and the maximum value was determined.

The transfer of the transferring layer of the invention are carried out by hot stamping apparatus 500 shown in FIG. 18 with utilizing transfer cartridge 400 shown in FIG. 17. Heat roller 430 shown in FIG. 18 having a diameter of 5 cm and a rubber hardness of 85 is utilized. The transfer is carried out with adjusting a surface temperature of heat roller to 200° C. and a pressure to 150 kg/cm$^2$ during 1.2 sec. The peeling angle is adjusted to 60 degree.

The maximum electrostatic charge in the present invention can be measured by following method.

The maximum electrostatic charge of the peeling layer at the peeling step is measured as follows. After the transfer of the transferring layer on the card substrate, transfer cartridge 400 is detached from hot stamping apparatus 500. Then, the peeling layer, which is peeled from the card, is picked out from transfer cartridge 400 in a length of 1 m. The maximum electrostatic charge of the peeling layer is measured by STATIRON M2 produced by SHISHIDO ELECTRO-STATIC, LTD with keeping the distance from the peeling layer 5 cm. The maximum electrostatic charge of the card is measured by measuring the maximum electrostatic charge of the surface of the card, which is discharged from hot stamping apparatus 500, in the same method as the measuring method of the peeling layer.

EXAMPLES

<Preparation of ID Card Substrate 1>

White polypropylene resin (Noburene FL25HA, manufactured by Mitsubishi Petrochemical Co., Ltd.) was applied onto both surfaces of a 350 µm thick polyethylene terephthalate sheet (Tetron HS350, manufactured by Teijin Ltd.) to achieve a thickness of 50 µm, employing an extrusion lamination method. One surface of the resulting composite resin sheet was subjected to a corona discharge treatment of 25 W/m2·minute. The resulting sheet was employed as a support.

<Formation of Image Receptive Layer>

A first image receptive layer forming liquid coating composition, a second image receptive layer forming liquid coating composition, and a third image receptive layer forming liquid coating composition formulated as described below were successively applied onto the corona discharge treated surface of the aforesaid support in the stated order to achieve a dried layer thickness of 0.2 µm, 2.5 µm, and 0.5 µm, respectively and subsequently dried, whereby a receiving layer was formed.

| <First Image receptive layer Forming Liquid Coating Composition> | |
|---|---|
| Polyvinyl butyral resin (S-lec BL-1, manufactured by Sekisui Chemical Co., Ltd.) | 9 parts |
| Isocyanate (Coronate HX, manufactured by Nippon Urethane Industry Co., Ltd.) | 1 part |
| Methyl ethyl ketone | 80 parts |
| Butyl acetate | 10 parts |
| <Second Image receptive layer Forming Liquid Coating Composition> | |
| Polyvinyl butyral resin (S-lec BX-1, manufactured by Sekisui Chemical Co., Ltd.) | 6 parts |
| Metal ion containing compound (Compound MS) | 4 parts |
| Methyl ethyl ketone | 80 parts |
| Butyl acetate | 10 parts |
| <Third Image receptive layer Forming Liquid Coating Composition> | |
| Polyethylene wax (Hitech E1000, urethane modified ethylene acrylic acid copolymer, manufactured by TOHO Chemical Industry Co., Ltd.) | 2 parts |
| Urethane modified ethylene acrylic acid copolymer (Hitech S6254, manufactured by TOHO Chemical Industry Co., Ltd.) | 8 parts |
| Methyl cellulose (SM15, manufactured by Shin-Etsu Chemical Co., Ltd.) | 0.1 part |
| Water | 90 parts |

(Formation of Information Carrier Comprised of Format Printing Layer)

On the aforesaid layer, a standard type format was provided by offset printing, employing UV printing ink (FD-O India ink, manufactured by Joto Ink). Further, on the format printing, UV curable OP varnish (FD-O dry coat varnish, manufactured by Joto Ink) was provided employing offset printing in the region excluding the sublimation thermal transfer image recording region, whereby an ID card substrate of the present invention was prepared.

(Formation of a Writing Layer)

A Yupo DFG-65 sheet, manufactured by Oji Yuka Co., Ltd. was adhered to the surface opposite the image receptive layer on the support and subsequently, a first writing layer forming liquid coating composition, a second writing layer forming liquid coating composition, and a third writing layer forming liquid coating composition, formulated as below, were successively applied in the stated order to result in a dried layer thickness of 5 µm, 15 µm, and 0.2 µm, respectively and subsequently dried, whereby an image receptive layer was formed.

| <First Writing Layer Forming Liquid Coating Composition> | |
|---|---|
| Polyester resin (Vylon 200, manufactured by TOYOBO Co., Ltd.) | 8 parts |
| Isocyanate (Coronate HX, manufactured by Nippon Urethane Industry Co., Ltd.) | 1 part |
| Carbon black | minute amount |
| Titanium dioxide particles (CR80, manufactured by Ishihara Sangyo Kaisha, Ltd.) | 1 part |
| Methyl ethyl ketone | 80 parts |
| Butyl acetate | 10 parts |
| <Second Writing Layer Forming Liquid Coating Composition> | |
| Polyester resin (Vylonar MD1200, manufactured by TOYOBO Co., Ltd.) | 4 parts |
| Silica | 5 parts |
| Titanium dioxide particles (CR80, manufactured by Ishihara Sangyo Kaisha, Ltd.) | 1 part |
| Water | 90 parts |
| <Third Writing Layer Forming Liquid Coating Composition> | |
| Polyamide resin (Sanmide 55, manufactured by Sanwa Chemical Industry Co., Ltd.) | 5 parts |
| Methanol | 95 parts |

(Formation of an Information Carrier Comprised of a Format Printing Layer)

On the aforesaid layer, a standard type format was provided by offset printing, employing UV printing ink (FD-O India ink, manufactured by Joto Ink). UV exposure conditions during printing were equivalent to 200 mj employing a high pressure mercury lamp.

The sheet comprising the image receptive layer and the writing layer, prepared as above, was subjected to final cutting employing a roll cutter, whereby 55 mm×85 mm ID Card Substrate 1 was prepared. The thickness of the card was 490 µm.

<Preparation of ID Card Substrate 2>

(Preparation of Image Receiving Sheet)

A 188 µm thick white support U2L98W (provided with an antistatic layer), manufactured by Teijin duPont Film Co., Ltd. was employed as a front sheet and a back sheet. A first sheet member was formed by successively applying a cushioning layer, an image receptive layer and an information carrier layer formulated as below onto the aforesaid support and subsequently dried, whereby a first sheet member was formed.

| (Photocurable Cushioning layer) Layer thickness of 10 µm | |
|---|---|
| Urethane acrylate oligomer (NK Oligo UA512, manufactured by Shin-Nakamura Chemical Industry Co., Ltd.) | 55 parts |
| Polyester acrylate (Aronics M6200, manufactured by TOAGOSEI Co., Ltd.) | 15 parts |

-continued

| (Photocurable Cushioning layer) Layer thickness of 10 μm | |
|---|---|
| Urethane acrylate oligomer (NK Oligo UA4000, manufactured by Shin-Nakamura Chemical Industry Co., Ltd.) | 25 parts |
| Hydroxycyclohexyl phenyl ketone (Irugacure 184, manufactured by Ciba Specialty Chemicals) | 5 parts |
| Methyl ethyl ketone | 100 parts |

After coating, actinic radiation curable compounds were dried at 90° C. for 30 seconds and subsequently photocured employing a mercury lamp (300 MJ/cm$^2$).

(Image receptive layer)

The first image receptive layer forming liquid coating composition and the second image receptive layer liquid coating composition formulated as below were applied onto the aforesaid cushioning layer in the stated order to result in a dried layer thickness of 2.5 μm and 0.5 μm, respectively, whereby an image receptive layer was formed.

| <First Image receptive layer Forming Liquid Coating Composition> | |
|---|---|
| Polyvinyl butyral resin (S-lec BX-1, manufactured by Sekisui Chemical Co., Ltd.) | 6 parts |
| Metal ion containing compound (Compound MS) | 4 parts |
| Methyl ethyl ketone | 80 parts |
| Butyl acetate | 10 parts |
| <Second Image receptive layer Forming Liquid Coating Composition> | |
| Polyethylene wax (Hitech E1000, manufactured by TOHO Chemical Industry Co., Ltd.) | 2 parts |
| Urethane modified ethylene acrylic acid copolymer (Hitech S6254, manufactured by TOHO Chemical Industry Co., Ltd.) | 8 parts |
| Methyl cellulose (SM15, manufactured by Shin-Etsu Chemical Co., Ltd.) | 0.1 part |
| Water | 90 parts |

(Formation of an Information Carrier Comprised of a Format Printing Layer)

On the aforesaid image receptive layer, format printing (employee certification and name) was achieved employing an offset printing method while using UV India ink as the printing ink. Subsequently, transparent UV curable OP varnish (FD-O Dry Coat Varnish, manufactured by Seito Ink) was provided in the region excluding the sublimation thermal transfer image recording region of the resulting format printing, employing offset printing. UV exposure conditions during printing were equivalent to 200 mJ employing a high pressure mercury lamp.

(Preparation of a Writing Sheet)

A 188 μm thick white support U2L98W (provided with an antistatic layer), manufactured by Teijin duPont Film Co., Ltd. was employed as a front sheet and a back sheet. Each of the writing layers formulated as below was successively applied to result in a dried layer thickness of 5 μm, 15 μm, and 0.2 μm, respectively, and subsequently dried, whereby a second sheet member was prepared.

| <First Writing Layer Forming Liquid Coating Composition> | |
|---|---|
| Polyester resin (Vylon 200, manufactured by TOYOBO Co., Ltd. | 8 parts |
| Isocyanate (Coronate HX, manufactured by Nippon Urethane Industry Co., Ltd.) | 1 part |
| Carbon black | minute amount |
| Titanium dioxide particles (CR80, manufactured by Ishihara Sangyo Kaisha, Ltd.) | 1 part |
| Methyl ethyl ketone | 80 parts |
| Butyl acetate | 10 parts |
| <Second Writing Layer Forming Liquid Coating Composition> | |
| Polyester resin (Vylonar MD1200, manufactured by TOYOBO Co., Ltd.) | 4 parts |
| Silica | 5 parts |
| Titanium dioxide particles (CR80, manufactured by Ishihara Sangyo Kaisha, Ltd.) | 1 part |
| Water | 90 parts |
| <Third Writing Layer Forming Liquid Coating Composition> | |
| Polyamide resin (Sanmide 55, manufactured by Sanwa Chemical Industry Co., Ltd.) | 5 parts |
| Methanol | 95 parts |

(Formation of Information Carrier Layer onto Writing Layer)

Format printing (ruled lines, the name of the card issuing entity, the telephone number of the card issuing entity) was carried put. A UV India ink was employed as a printing ink. UV exposure conditions during printing were equivalent to 200 mJ employing a high pressure mercury lamp.

Macroplast QR3460 manufactured by Henkel Co., which was hot-melted at 130° C., was applied onto the support surface of the first sheet member prepared as above. An IC card sheet "FT Series", manufactured by Hitachi Maxell Co., Ltd. was applied onto the resulting coating, and further Macroplast QR3460 manufactured by Henkel Co., which was hot-melted at 130° C., was applied onto the support surface of the second sheet member. Adhesion was carried out employing a pressure heating roller conditioned at a pressure of 0.2 kg/cm$^2$ and a temperature of 60° C. The adhered sheets were stored at 23° C. and 55 percent for 7 days, and thereafter, were subjected to final cutting, employing a roll cutter, whereby 55 mm×85 mm ID Card Substrate 2 was prepared. The thickness of the resulting card was 740 μm.

<Description Method of Authentication Images and Attribute Information Images>

Information was recorded on ID Card Substrates 1 and 2, employing the information recording member described below.

(Preparation of Ink Sheet for Sublimation Type Thermosensitive Transfer Recording>

Each of a yellow ink layer forming liquid coating composition, magenta ink layer forming liquid coating composition, and cyan ink layer forming liquid coating composition, formulated as below, was applied onto a 6 μm thick polyethylene terephthalate sheet, which had been subjected to a fusion resistant treatment on the reverse surface to result in a thickness of 1 μm, whereby three color ink sheets i.e., a yellow ink sheet, a magenta ink sheet, and a cyan ink sheet were prepared.

| <Yellow Ink Layer Forming Liquid Coatings Composition> | |
| --- | --- |
| Yellow dye (MS Yellow, manufactured by Mitsui Toatsu Senryo Co., Ltd.) | 3 parts |
| Polyvinyl acetal (Denka Butyral KY-24, manufactured by Denki Kagaku Kogyo K. K.) | 5.5 parts |
| Polymethyl methacrylate modified polystyrene (Rededa GP-200, manufactured by TOAGOSEI Co., Ltd.) | 1 part |
| Urethane modified silicone oil (Diaroma SP-2105, manufactured by Dainichiseika Color & Chemicals Mfg. Co., Ltd.) | 0.5 part |
| Methyl ethyl ketone | 70 parts |
| Toluene | 20 parts |
| <Magenta Ink Layer Forming Liquid Coatings Composition> | |
| Magenta dye (MS Magenta, manufactured by Mitsui Toatsu Senryo Co., Ltd.) | 2 parts |
| Polyvinyl acetal (Denka Butyral KY-24, manufactured by Denki Kagaku Kogyo K. K.) | 5.5 parts |
| Polymethyl methacrylate modified polystyrene (Rededa GP-200, manufactured by TOAGOSEI Co., Ltd.) | 2 parts |
| Urethane modified silicone oil (Diaroma SP-2105, manufactured by Dainichiseika Color & Chemicals Mfg. Co., Ltd.) | 0.5 part |
| Methyl ethyl ketone | 70 parts |
| Toluene | 20 parts |
| <Cyan Ink Layer Forming Liquid Coatings Composition> | |
| Cyan dye (Kayaset Blue 136, manufactured by Nippon Kayaku Co., Ltd.) | 3 parts |
| Polyvinyl acetal (Denka Butyral KY-24, manufactured by Denki Kagaku Kogyo K. K.) | 5.6 parts |
| Polymethyl methacrylate modified polystyrene (Rededa GP-200, manufactured by Toagosei Co., Ltd.) | 1 part |
| Urethane modified silicone oil (Diaroma SP-2105, manufactured by Dainichiseika Color & Chemicals Mfg. Co., Ltd.) | 0.5 part |
| Methyl ethyl ketone | 70 parts |
| Toluene | 20 parts |

(Preparation of a Fusion Type Thermosensitive Transfer Recording Ink Sheet)

The ink layer forming liquid coating composition was applied onto a 6 μm thick polyethylene terephthalate sheet, which had been subjected to a fusion resistant treatment on the back surface to result in a thickness of 2 μm and subsequently dried, whereby an ink sheet was prepared.

| <Ink Layer Forming Liquid Coating Composition> | |
| --- | --- |
| Carnauba wax | 1 part |
| Ethylene vinyl acetate copolymer (EV40Y, Manufactured by Mitsui duPont Chemical Co., Ltd.) | 1 part |
| Carbon black | 3 parts |
| Phenol resin (Tamanol 521, manufactured by Arakawa Chemical Industries, Ltd.) | 5 parts |
| Methyl ethyl ketone | 90 parts |

(Formation of Facial Images)

The ink side of the sublimation type thermosensitive transfer recording ink sheet was faced with an image receptive layer and the ink sheet side was heated employing a thermal head under conditions of an output of 0.23 W/dot, a pulse width of 0.3–4.5 milliseconds, and a dot density of 16 dots/mm, whereby a facial image exhibiting image gradation was formed on the image receptive layer. In the resulting image, the aforesaid dyes and nickel of the receiving layer formed complexes.

(Formation of Textual Information)

The ink side of the sublimation type thermosensitive transfer recording ink sheet was faced with an image forming medium and the ink sheet side was heated employing a thermal head under conditions of an output of 0.5 W/dot, a pulse width of 1.0 milliseconds, and a dot density of 16 dots/mm, whereby textual information was formed on image recording media for an IC card.

Figure 11:
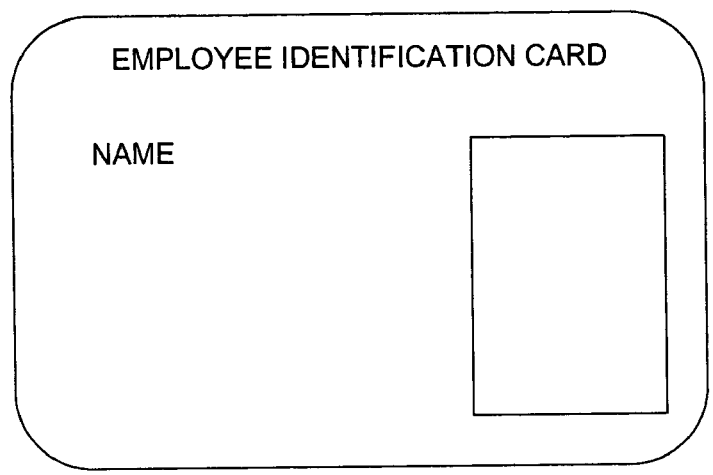
FIG. 11 is a front surface view of an ID card or IC card.
Figure 12:
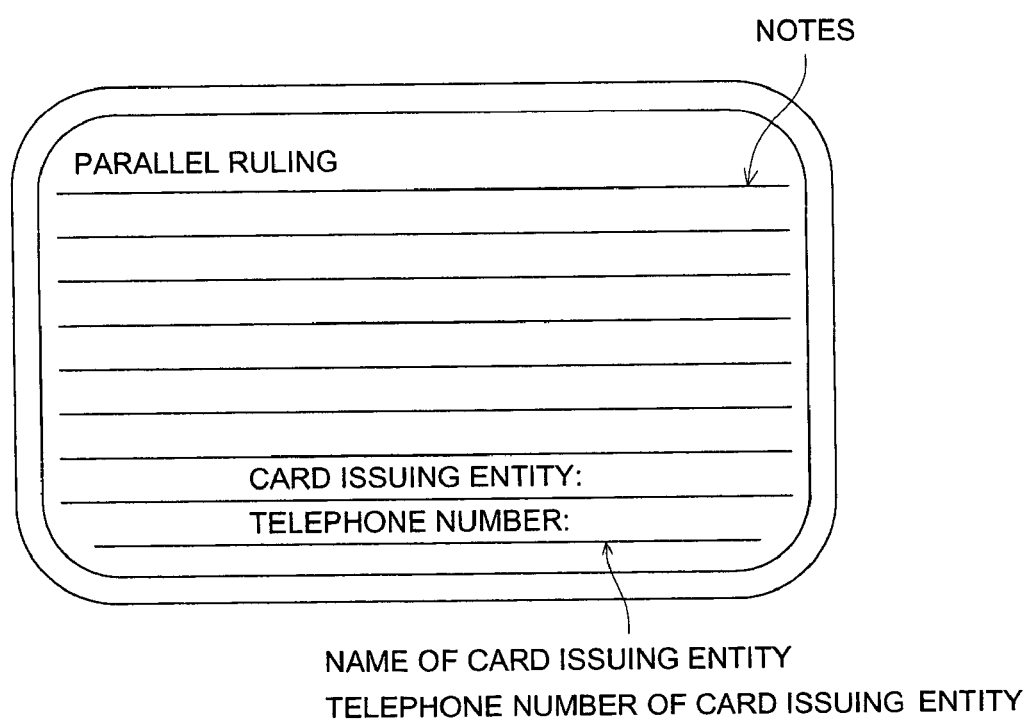
FIG. 12 is a back surface view of an ID card or IC card.

As noted below, the facial image as well as alphanumeric information was provided and subsequently the protective layer was provided employing the transfer foil. FIG. 11 is a front view of an ID card or IC card substrate, while FIG. 12 is a back view of that ID card or IC card substrate. Provided on the front surface of the ID card or IC card substrate recorded is personal identification information such as name and a facial image. On the other hand, on the back surface of the ID card or IC card substrate provided are ruled lines so that personal identification information such as name of the card issuing company, telephone number of the card issuing company can be additionally written.

Figure 13:
FIG. 13 is a front surface view of an ID card or an IC card.
Figure 14:
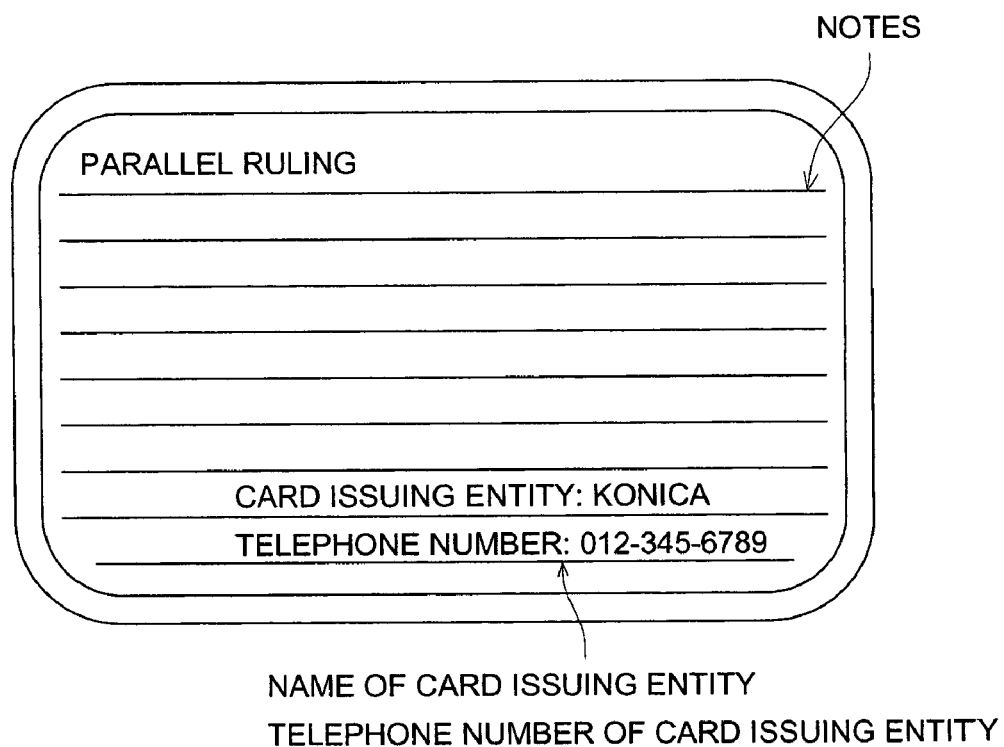
FIG. 14 is a back surface view of an ID card or an IC card.

FIG. 13 is the front view of an ID card or IC card, while FIG. 14 is the back view of that ID card or IC card. On the front surface, recorded is personal identification information such as name, ID number, and facial image of the bearer. On the other hand, provided on the back surface of the ID card or IC card substrate are ruled lines so that other identification information such as name of the card issuing company, telephone number of the card issuing company can be additionally written.

An ID card or IC card preparation apparatus is constituted as shown in FIGS. 15–19.

Figure 15:
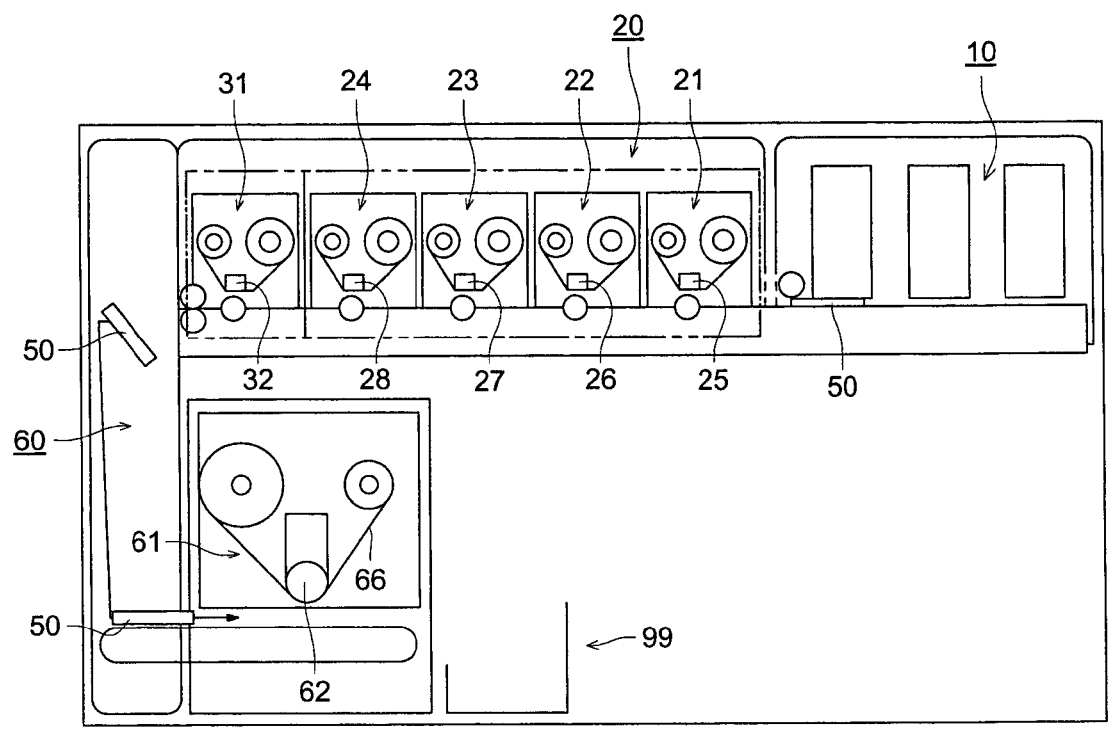
FIG. 15 is a structural view of the preparation apparatus of ID cards or IC cards.

In FIG. 15, card substrate-supplying section 10 as well as information recording section 20 is provided in an upper position, while resin providing section 60 is provided in a lower position. Prepared as image recording media may be either cards or sheets.

In card substrate-supplying section 10, in order to write the personal identification information of the card bearer, a plurality of card substrates 50 which have been cut in the form of sheets is stored so that the portrait recording surface faces upward. In this example, card substrate 50 is comprised of a support and an image receptive layer, and is automatically fed sheet by sheet at a time from card substrate-supplying section 10 at the specified timing.

In image recording section 20, housed are yellow ribbon cassette 21, magenta ribbon cassette 22, cyan ribbon cassette 23, and black ribbon cassette 24, and recording heads 25-28 are arranged corresponding to each of the cassettes. While card substrate 50 is conveyed, a gradation carrying image region such as the facial image of the card bearer in the specified region of the aforesaid image receptive layer is recorded by thermal transfer employing the thermal transfer sheet, as well as the yellow ribbon, the magenta ribbon, and the cyan ribbon. Further, textual ribbon cassette 31 as well as recording head 32 is housed there, and authentication information such as name, card issue date, etc. is recorded by thermal transfer, employing the textual ribbon and thermal transfer sheets. Thus an image recording layer is formed.

In resin providing section 60, housed is transfer foil cassette 61, and thermal transfer head 62 is housed corresponding to aforesaid transfer foil cassette 61. Transparent protective layer transfer foil 66 (being a cured transfer foil) is housed in transfer foil cassette 61, and a cured protective layer containing transferring layer is provided by transferring aforesaid transparent protective layer transfer foil 66. The resulting card is ejected to card storage section 99.

Figure 16:
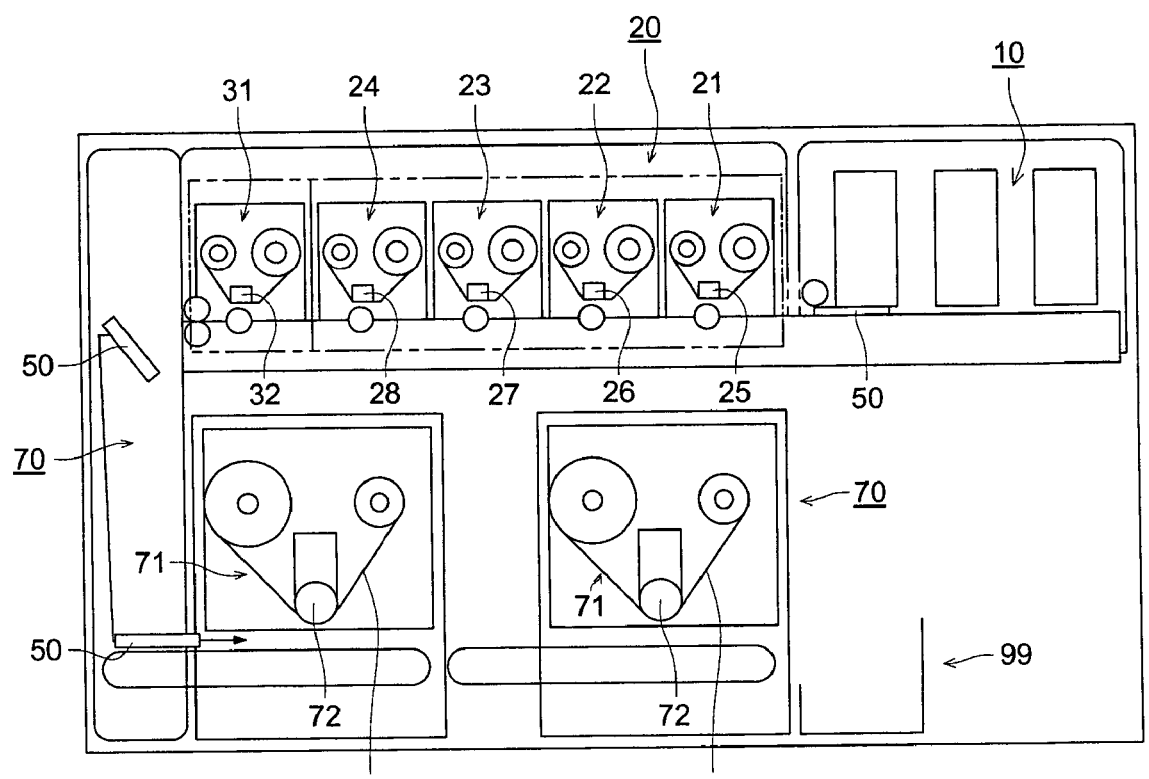
FIG. 16 is a structural view of the preparation apparatus of ID cards or IC cards.

In FIG. 16, card substrate-supplying section 10 and information recording section 20 are constituted in the same manner as FIG. 15. However, transparent protective layer and/or optically variable element transferring layer providing section or resinous layer providing section 70 is also housed there. Following this, further, transparent protective layer and/or optically variable element transferring layer providing section or resin providing section is applied.

In transparent protective layer and/or optically variable element transferring layer providing section or resinous layer providing section 70, housed is transfer foil cassette 71, and thermal transfer head 72 is housed corresponding to aforesaid transfer foil cassette 71. Optically variable element transfer foil 43 and/or transparent protective layer transfer foil 64 and curable transfer foil 66 are transferred, whereby an optically variable element transferring layer and/transparent protective transferring layer and a cured protective layer containing transferring layer are applied.

Further, resin providing section 60 in FIG. 15 and transparent protective layer and/or optically variable element transferring layer providing section or resinous layer providing section 70 in FIG. 16 are constituted as shown in FIGS. 17–19.

In the interior of hot stamping apparatus 500 (resin providing section 60 or transparent resinous layer and/or optically variable element transfer providing section/or resin providing section 70), set is transfer cartridge 400 (transfer foil cassette 61 or 71). In transfer foil housing section 421 of aforesaid transfer cartridge 400, housed are transfer foil driven core 451a and transfer foil drive core 451b. By rotating transfer foil drive core 451b, protective layer transfer foil 200 on transfer foil drive core 451a is wound via metal drive rollers 422a and 422b, and the surface protective layer (transferring layer) comprised of photo-cured resin layer 104 is transferred onto card substrate 50, employing heating roller apparatus 430.

<Preparation of Transfer Foils>

Synthetic Example 1

(Synthetic Example 1 of Resins Added to IC Card Surface Protective Layer)

Under a flow of nitrogen gas, charged into a three-necked flask were 73 parts of methyl methacrylate, 15 parts of styrene, 12 parts of methacrylic acid, 500 parts of ethanol, and 3 parts of α,α'-azobisisobutylnitrile. Subsequently, the resulting mixture underwent reaction under a flow of nitrogen gas at 80° C. for 6 hours. Thereafter, 3 parts of triethylammonium chloride and 1 part of glycidyl methacrylate were added, and the resulting mixture underwent reaction for 3 hours, whereby targeted Synthetic Binder 1 was prepared, being an acryl-based copolymer.

(Transfer Foil 1)

The releasing layer, the photo-cured resin layer, the intermediate layer and the adhesive layer, formulated as below, were successively applied onto one surface of polyethylene terephthalate sheet (S-25), manufactured by Daiafoil Hoechst Co., Ltd., employing wire bar coating.

(Releasing Layer) Coated amount of 0.2 g/m$^2$ (Preparation of Antistatic Layer)

(Preparation of Electrically Conductive Minute Metal Oxide Particle Dispersion-1)

Dissolved in 2,000 ml of water/ethanol mixed solution was 65 g of stannic chloride hydrate. After preparing the completely dissolved solution, the resulting solution was boiled to form co-precipitates. The resulting precipitates were collected by decantation and washed well with distilled water. After confirming that by dripping a silver nitrate solution into water which had washed the precipitates, chloride ions underwent no reaction, distilled water was added to result in a solid concentration of 8 percent by weight. Further, 40 ml of 30 percent ammonia water was added and heated in a water bath, whereby Electrically Conductive Minute Metal Oxide Particle Dispersion-1 was prepared.

(Antistatic Layer Liquid Coating Composition)

| | |
|---|---|
| Aforesaid Electrically Conductive Minute Metal Oxide Particle Dispersion-1 | 300 weight parts |
| Copolymer latex of butyl acrylate/styrene/glycidyl acrylate at a weight ratio of 40/20/40 (30 weight percent solids) | 64 weight parts |
| Copolymer latex of butyl acrylate/t-butyl acrylate/styrene/2-hydroxyacrylate at a weight ratio of 10/35/30/25 (30 weight percent solids) | 16 weight parts |
| Pure water | 620 weight parts |

After coating, drying was carried out at 120° C. for 2 minutes.

| (Photo-cured resin layer) Coated amount of 8.0 g/m$^2$ | |
|---|---|
| A-9300, manufactured by Shin-Nakamura Chemical Industry Co., Ltd./EA-1020, manufactured by Shin-Nakamura Chemical Industry Co., Ltd. at a weight ratio of 35/11 | 75 parts |
| Reaction initiator (Irugacure 184, manufactured by Ciba-Geigy Japan Limited.) | 5 parts |
| Resin 1 used in the actinic radiation curable layer | 48 parts |
| Toluene | 500 parts |

After coating, the actinic radiation curable compound was dried at 90° C. for 30 seconds and subsequently photocured employing a mercury lamp (300 mJ/cm$^2$).

| <Intermediate layer> Layer thickness of 0.6 μm | |
| --- | --- |
| Polyvinyl butyral resin (S-lec BX-1, manufactured by Sekisui Chemical Co., Ltd.) | 5 parts |
| Toughtex M-1913 (manufactured by Asahi Chemical Industry Co., Ltd.) | 3 parts |
| Curing agent polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

| <Adhesive layer> Layer thickness of 0.3 μm | |
| --- | --- |
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nihon Junyaku Co., Ltd.) | 2 parts |
| Water | 45 parts |
| Ethanol | 45 parts |

After coating, drying was carried out at 70° C. for 30 seconds.

While employing Actinic Radiation Cured Transfer Foil 1, constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Foil 2)

The releasing layer, the photo-cured resin layer, the intermediate layer and the adhesive layer, formulated as below, were successively applied onto one surface of polyethylene terephthalate sheet (S-25), manufactured by Daiafoil Hoechst Co., Ltd., employing wire bar coating.

(Releasing Layer) Coated amount of 4.0 g/m²

(Preparation of Antistatic Layer)

(Preparation of Electrically Conductive Minute Metal Oxide Particle Dispersion-1)

Dissolved in 2,000 ml of water/ethanol mixed solution was 65 g of stannic chloride hydrate. After preparing the completely dissolved solution, the resulting solution was boiled to form co-precipitates. The resulting precipitates were collected by decantation and washed well with distilled water. After confirming that by dripping a silver nitrate solution into water which had washed the precipitates, chloride ions underwent no reaction, distilled water was added to result in a solid concentration of 8 percent by weight. Further, 40 ml of 30 percent ammonia water was added and heated in a water bath, whereby Electrically Conductive Minute Metal Oxide Particle Dispersion-1 was prepared.

| (Antistatic Layer Liquid Coating Composition) | |
| --- | --- |
| Aforesaid Electrically Conductive Minute Metal Oxide Particle Dispersion-1 | 300 weight parts |
| Copolymer latex of butyl acrylate/ styrene/glycidyl acrylate at a weight ratio of 40/20/40 (30 weight percent solids) | 64 weight parts |
| Copolymer latex of butyl acrylate/ t-butyl acrylate/styrene/ 2-hydroxyacrylate at a weight ratio of 10/35/30/25 (30 weight percent solids) | 16 weight parts |
| Pure water | 620 weight parts |

After coating, drying was carried out at 120° C. for 2 minutes.

| (Photo-cured resin layer) Coated amount of 8.0 g/m² | |
| --- | --- |
| A-9300, manufactured by Shin-Nakamura Chemical Industry Co., Ltd./EA-1020, manufactured by Shin-Nakamura Chemical Industry Co., Ltd. at a ratio of 35/11 | 75 parts |
| Reaction initiator (Irugacure 184, manufactured by Ciba-Geigy Japan Limited) | 5 parts |
| Resin 1 used in the actinic radiation curable layer | 48 parts |
| Toluene | 500 parts |

After coating, the actinic radiation curable compound was dried at 90° C. for 30 seconds and subsequently photocured employing a mercury lamp (300 mJ/cm²).

| <Intermediate layer> Layer thickness of 0.6 μm | |
| --- | --- |
| Polyvinyl butyral resin (S-lec BX-1, manufactured by Sekisui Chemical Co., Ltd.) | 5 parts |
| Toughtex M-1913 (manufactured by Asahi Chemical Industry Co., Ltd.) | 3 parts |
| Curing agent polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

| <Adhesive layer> Layer thickness of 0.3 μm | |
| --- | --- |
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was achieved at 70° C. for 30 seconds.

While employing Actinic Radiation Cured Transfer Foil 2 constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Foil 3)

The releasing layer, the photo-cured resin layer, the intermediate layer and the adhesive layer, formulated as below, were successively applied onto one surface of polyethylene terephthalate sheet (S-25), manufactured by Daiafoil Hoechst Co., Ltd., employing wire bar coating.

(Releasing Layer) Coated amount of 0.2 g/m²

(Preparation of Antistatic Layer)

(Preparation of Electrically Conductive Minute Metal Oxide Particle Dispersion-1)

Dissolved in 2,000 ml of water/ethanol mixed solution was 65 g of stannic chloride hydrate. After preparing the completely dissolved solution, the resulting solution was boiled to form co-precipitates. The resulting precipitates were collected by decantation and washed well with distilled water. After confirming that by dripping a silver nitrate solution into water which had washed the precipitates, chloride ions underwent no reaction, distilled water was added to result in a solid concentration of 8 percent by weight. Further, 40 ml of 30 percent ammonia water was added and heated in a water bath, whereby Electrically Conductive Minute Metal Oxide Particle Dispersion-1 was prepared.

| (Antistatic Layer Liquid Coating Composition) | |
|---|---|
| Aforesaid Electrically Conductive Minute Metal Oxide Particle Dispersion-1 | 300 weight parts |
| Copolymer latex of butyl acrylate/ styrene/glycidyl acrylate at a weight ratio of 40/20/40 (30 weight percent solids) | 64 weight parts |
| Copolymer latex of butyl acrylate/ t-butyl acrylate/styrene/ 2-hydroxyacrylate at a weight ratio of 10/35/30/25 (30 weight percent solids) | 16 weight parts |
| Pure water | 620 weight parts |

After coating, drying was carried out at 120° C. for 2 minutes.

| (Photo-cured resin layer) Coated amount of 2.0 g/m² | |
|---|---|
| A-9300, manufactured by Shin-Nakamura Chemical Industry Co., Ltd./EA-1020, manufactured by Shin-Nakamura Chemical Industry Co., Ltd. at 35/11 | 75 parts |
| Reaction initiator (Irugacure 184, manufactured by Ciba-Geigy Japan Limited) | 5 parts |
| Resin 1 used in the actinic radiation curable layer | 48 parts |
| Toluene | 500 parts |

After coating, the actinic radiation curable compound was dried at 90° C. for 30 seconds and subsequently photocured employing a mercury lamp (300 mJ/cm²).

| <Intermediate layer> Layer thickness of 0.6 µm | |
|---|---|
| Polyvinyl butyral resin (S-lec BX-1, manufactured by Sekisui Chemical Co., Ltd.) | 5 parts |
| Toughtex M-1913 (manufactured by Asahi Chemical Industry Co., Ltd.) | 3 parts |
| Curing agent polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

| <Adhesive layer> Layer thickness of 0.3 µm | |
|---|---|
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was achieved at 70° C. for 30 seconds.

While employing Actinic Radiation Cured Transfer Foil 3 constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Foil 4)

The releasing layer, the photo-cured resin layer, the intermediate layer and the adhesive layer, formulated as below, were successively applied onto one surface of polyethylene terephthalate sheet (S-25), manufactured by Daiafoil Hoechst Co., Ltd., employing wire bar coating.

| (Releasing Layer) Coated amount of 0.2 g/m² | |
|---|---|
| Anionic surfactant (Adekacol CC-36, manufactured by Asahi Denka Co., Ltd.) | 1 part |
| Polyvinyl alcohol GL-05, manufactured by Nippon Synthetic Chemical Industry Co., Ltd. | 9 parts |
| Water | 90 parts |

After coating, the releasing layer was dried at 90° C. for 30 seconds.

| (Photo-cured resin layer) Coated amount of 8.0 g/m² | |
|---|---|
| A-9300, manufactured by Shin-Nakamura Chemical Industry Co., Ltd./EA-1020, manufactured by Shin-Nakamura Chemical Industry Co., Ltd. at a weight ratio of 35/11 | 75 parts |
| Reaction initiator (Irugacure 184, manufactured by Ciba-Geigy Japan Limited) | 5 parts |

| (Photo-cured resin layer) Coated amount of 8.0 g/m² | |
| --- | --- |
| Resin 1 used in the actinic radiation curable layer | |
| Toluene | 48 parts |

After coating, the actinic radiation curable compound was dried at 90° C. for 30 seconds and subsequently photocured employing a mercury lamp (300 mJ/cm²).

| <Intermediate layer> Layer thickness of 0.6 μm | |
| --- | --- |
| Polyvinyl butyral resin (S-lec BX-1, manufactured by Sekisui Chemical Co., Ltd.) | 5 parts |
| Toughtex M-1913 (manufactured by Asahi Chemical Industry Co., Ltd.) | 3 parts |
| Curing agent polyisocyanate (Coronate HX, manufactured by Nippon Polyurethane Co., Ltd.) | 2 parts |
| Methyl ethyl ketone | 90 parts |

After coating, the curing agent was cured at 50° C. for 24 hours.

| <Adhesive layer Liquid Coating Composition> Layer thickness of 0.3 μm | |
| --- | --- |
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was achieved at 70° C. for 30 seconds.

While employing Actinic Radiation Cured Transfer Foil 4 constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Foil 5)

The releasing layer, the photo-cured resin layer, the intermediate layer and the adhesive layer, formulated as below, were successively applied onto one surface of polyethylene terephthalate sheet (S-25), manufactured by Daiafoil Hoechst Co., Ltd., employing wire bar coating.

| (Releasing Layer) Layer thickness of 0.2 g/m² | |
| --- | --- |
| Polyvinyl alcohol GL-05, manufactured by Nippon Synthetic Chemical Industry Co., Ltd.) | 10 parts |
| Water | 90 parts |

After coating, the releasing layer was dried at 90° C. for 30 seconds.

| (Photo-cured resin layer) Coated amount of 8.0 g/m² | |
| --- | --- |
| A-9300, manufactured by Shin-Nakamura Chemical Industry Co., Ltd./EA-1020, manufactured by Shin-Nakamura Chemical Industry Co., Ltd. at a weight ratio of 35/11 | 75 parts |
| Reaction initiator (Irugacure 184, manufactured by Ciba-Geigy Japan Limited) | 5 parts |
| Resin 1 used in the actinic radiation curable layer | 48 parts |
| Toluene | 500 parts |

After coating, the actinic radiation curable compound was dried at 90° C. for 30 seconds and subsequently photocured employing a mercury lamp (300 mJ/cm²).

| <Intermediate layer> Layer thickness of 0.6 μm | |
| --- | --- |
| Polyvinyl butyral resin (S-lec BX-1, manufactured by Sekisui Chemical Co., Ltd.) | 5 parts |
| Toughtex M-1913 (manufactured by Asahi Chemical Industry Co., Ltd.) | 3 parts |
| Curing agent polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

| <Adhesive layer Liquid Coating Composition> Layer thickness of 0.3 μm | |
| --- | --- |
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was achieved at 70° C. for 30 seconds.

While employing Actinic Radiation Cured Transfer Foil 5 constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Roil 6)

The releasing layer, the photo-cured resin layer, the intermediate layer and the adhesive layer, formulated as below, were successively applied onto one surface of polyethylene terephthalate sheet (S-25), manufactured by Daiafoil Hoechst Co., Ltd., employing wire bar coating.

| (Releasing Layer) Coated amount of 0.2 g/m² | |
|---|---|
| Polyvinyl alcohol (GL-05, manufactured by Nippon Synthetic Chemical Industry Co., Ltd.) | 10 parts |
| Water | 90 parts |

After coating, the releasing layer was dried at 90° C. for 30 seconds.

| (Photo-cured resin layer) Coated amount of 2.0 g/m² | |
|---|---|
| A-9300, manufactured by Shin-Nakamura Chemical Industry Co., Ltd./EA-1020, manufactured by Shin-Nakamura Chemical Industry Co., Ltd. at a weight ratio of 35/11 | 75 parts |
| Reaction initiator (Irugacure 184, manufactured by Ciba-Geigy Japan Limited) | 5 parts |
| Resin 1 used in the actinic radiation curable layer | 48 parts |
| Toluene | 500 parts |

After coating, the actinic radiation curable compound was dried at 90° C. for 30 seconds and subsequently photocured employing a mercury lamp (300 mJ/cm²).

| <Intermediate layer> Layer thickness of 0.6 μm | |
|---|---|
| Polyvinyl butyral resin (S-lec BX-1, manufactured by Sekisui Chemical Co., Ltd.) | 5 parts |
| Toughtex M-1913 (manufactured by Asahi Chemical Industry Co., Ltd.) | 3 parts |
| Curing agent polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

| <Adhesive layer Liquid Coating Composition> Layer thickness of 0.3 μm | |
|---|---|
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was achieved at 70° C. for 30 seconds.

While employing Actinic Radiation Cured Transfer Foil 6 constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Foil 7)

The releasing layer, the photo-cured resin layer, the intermediate layer, the intermediate layer (the primer layer), and the adhesive layer, formulated as below, were successively applied onto one surface of polyethylene terephthalate sheet (S-25), manufactured by Daiafoil Hoechst Co., Ltd., employing wire bar coating.

(Releasing Layer) Coated amount of 0.2 g/m²

(Preparation of Antistatic Layer)

(Preparation of Electrically Conductive Minute Metal Oxide Particle Dispersion-1)

Dissolved in 2,000 ml of water/ethanol mixed solution was 65 g of stannic chloride hydrate. After preparing the completely dissolved solution, the resulting solution was boiled to form co-precipitates. The resulting precipitates were collected by decantation and well washed with distilled water. After confirming that by dripping a silver nitrate solution into water which had washed the precipitates, chloride ions underwent no reaction, distilled water was added to result in a solid concentration of 8 percent by weight. Further, 40 ml of 30 percent ammonia water was added and heated in a water bath, whereby Electrically Conductive Minute Metal Oxide Particle Dispersion-1 was prepared.

| (Antistatic Layer Liquid Coating Composition) | |
|---|---|
| Aforesaid Electrically Conductive Minute Metal Oxide Particle Dispersion-1 | 300 weight parts |
| Copolymer latex of butyl acrylate/styrene/glycidyl acrylate at a weight ratio of 40/20/40 (30 weight percent solids) | 64 weight parts |
| Copolymer latex of butyl acrylate/t-butyl acrylate/styrene/2-hydroxyacrylate at a weight ratio of 10/35/30/25 (30 weight percent solids) | 16 weight parts |
| Pure water | 620 weight parts |

After coating, drying was carried out at 120° C. for 2 minutes.

| (Photo-cured resin layer) Coated amount of 8.0 g/m² | |
|---|---|
| A-9300, manufactured by Shin-Nakamura Chemical Industry Co., Ltd./EA-1020, manufactured by Shin-Nakamura Chemical Industry Co., Ltd. at a weight ratio of 35/11 | 75 parts |
| Reaction initiator (Irugacure 184, manufactured by Ciba-Geigy Japan Limited) | 5 parts |
| Resin 1 used in the actinic radiation curable layer | 48 parts |
| Toluene | 500 parts |

After coating, the actinic radiation curable compound was dried at 90° C. for 30 seconds and subsequently photocured employing a mercury lamp (300 mJ/cm2).

| <Intermediate layer> layer thickness of 0.6 μm | |
|---|---|
| Polyvinyl butyral resin (S-lec BX-1, manufactured by Sekisui Chemical Co., Ltd.) | 4 parts |
| Toughtex M-1913 (manufactured by Asahi Chemical Industry Co., Ltd.) | 3 parts |

-continued

| <Intermediate layer> layer thickness of 0.6 μm | |
|---|---|
| Curing agent polyisocyanate (Coronate HX, manufactured by Nippon Polyurethane Industry Co., Ltd.) | 2 parts |
| Ultraviolet absorbent (Tinuvin-P, manufactured by Ciba-Geigy Corp.) | 1 part |
| Methyl ethyl ketone | 90 parts |

After coating, the curing agent was cured at 50° C. for 24 hours.

| <Primer Layer> Layer thickness of 1.2 μm | |
|---|---|
| Polyvinyl butyral resin (S-lec BX-1, manufactured by Sekisui Chemical Co., Ltd.) | 3 parts |
| Epofriend A-1020 (Dicel Chemical Industries, Ltd.) | 5 parts |
| Polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

| <Adhesive layer Liquid Coating Composition> Layer thickness of 0.3 μm | |
|---|---|
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was achieved at 70° C. for 30 seconds.

While employing Actinic Radiation Cured Transfer Foil 7 constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Foil 8)

The releasing layer, the photo-cured resin layer, the intermediate layer and the adhesive layer, formulated as below, were successively applied onto one surface of polyethylene terephthalate sheet (S-25), manufactured by Daiafoil Hoechst Co., Ltd., employing wire bar coating.

(Releasing Layer) Coated amount of 0.2 g/m²

(Preparation of Antistatic Layer)

(Preparation of Electrically Conductive Minute Metal Oxide Particle Dispersion-1)

Dissolved in 2,000 ml of water/ethanol mixed solution was 65 g of stannic chloride hydrate. After preparing the completely dissolved solution, the resulting solution was boiled to form co-precipitates. The resulting precipitates were collected by decantation and washed well with distilled water. After confirming that by dripping a silver nitrate solution into water which had washed the precipitates, chloride ions underwent no reaction, distilled water was added to result in a solid concentration of 8 percent by weight. Further, 40 ml of 30 percent ammonia water was added and heated in a water bath, whereby Electrically Conductive Minute Metal Oxide Particle Dispersion-1 was prepared.

| (Antistatic Layer Liquid Coating Composition) | |
|---|---|
| Aforesaid Electrically Conductive Minute Metal Oxide Particle Dispersion-1 | 300 weight parts |
| Copolymer latex of butyl acrylate/ styrene/glycidyl acrylate at a weight ratio of 40/20/40 (30 weight percent solids) | 64 weight parts |
| Copolymer latex of butyl acrylate/ t-butyl acrylate/styrene/ 2-hydroxyacrylate at a weight ratio of 10/35/30/25 (30 weight percent solids) | 16 weight parts |
| Pure water | 620 weight parts |

After coating, drying was carried out at 120° C. for 2 minutes.

| (Photo-cured resin layer) Coated amount of 8.0 g/m² | |
|---|---|
| A-9300, manufactured by Shin-Nakamura Chemical Industry Co., Ltd./EA-1020, manufactured by Shin-Nakamura Chemical Industry Co., Ltd. at a weight ratio of 35/11 | 75 parts |
| Reaction initiator (Irugacure 184, manufactured by Ciba-Geigy Japan Limited) | 5 parts |
| Resin 1 used in the actinic radiation curable layer | 48 parts |
| Toluene | 500 parts |

After coating, the actinic radiation curable compound was dried at 90° C. for 30 seconds and subsequently photocured employing a mercury lamp (300 mJ/cm²).

| <Intermediate layer> Layer thickness of 0.6 μm | |
|---|---|
| Polyvinyl butyral resin (S-lec BX-1, manufactured by Sekisui Chemical Co., Ltd.) | 4 parts |
| Toughtex M-1913 (manufactured by Asahi Chemical Industry Co., Ltd.) | 3 parts |
| Curing agent polyisocyanate (Coronate HX, manufactured by Nippon Polyurethane Industry Co., Ltd.) | 2.4 parts |
| Ultraviolet absorbent (Tinuvin-400, manufactured by Ciba-Geigy Corp.) | 0.3 part |
| Photo stabilizer (Tinuvin-123, manufactured by Ciba-Geigy Corp.) | 0.3 part |
| Methyl ethyl ketone | 90 parts |

After coating, the curing agent was cured at 50° C. for 24 hours.

| <Adhesive layer Liquid Coating Composition> Layer thickness of 0.3 μm | |
|---|---|
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was achieved at 70° C. for 30 seconds.

While employing Actinic Radiation Cured Transfer Foil 8 constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Foil 9)

The releasing layer, the non-photocurable resinous layer, the intermediate layer and the adhesive layer, formulated as below, were successively applied onto one surface of polyethylene terephthalate sheet (S-25), manufactured by Daiafoil Hoechst Co., Ltd., employing wire bar coating.

(Releasing Layer) Coated amount of 0.2 g/m²

(Preparation of Antistatic Layer)

(Preparation of Electrically Conductive Minute Metal Oxide Particle Dispersion-1)

Dissolved in 2,000 ml of water/ethanol mixed solution was 65 g of stannic chloride hydrate. After preparing the completely dissolved solution, the resulting solution was boiled to form co-precipitates. The resulting precipitates were collected by decantation and well washed with distilled water. After confirming that by dripping a silver nitrate solution into water which had washed the precipitates, chloride ions underwent no reaction, distilled water was added to result in a solid concentration of 8 percent by weight. Further, 40 ml of 30 percent ammonia water was added and heated in a water bath, whereby Electrically Conductive Minute Metal Oxide Particle Dispersion-1 was prepared.

| (Antistatic Layer Liquid Coating Composition) | |
|---|---|
| Aforesaid Electrically Conductive Minute Metal Oxide Particle Dispersion-1 | 300 weight parts |
| Copolymer latex of butyl acrylate/ styrene/glycidyl acrylate at a weight ratio of 40/20/40 (30 weight percent solids) | 64 weight parts |
| Copolymer latex of butyl acrylate/ t-butyl acrylate/styrene/ 2-hydroxyacrylate at a weight ratio of 10/35/30/25 (30 weight percent solids) | 16 weight parts |
| Pure water | 620 weight parts |

After coating, drying was carried out at 120° C. for 2 minutes.

(Non-photocurable Resinous Layer) Coated amount of 8.0 g/m²

| | |
|---|---|
| Acryl based resin (Dianal BR-87, manufactured by Mitsubishi Rayon Co., Ltd.) | 5 parts |
| Polyvinyl acetacetal (having an SP value of 9.4) (KS-1, manufactured by Sekisui Chemical Co., Ltd.) | 5 parts |
| Methyl ethyl ketone | 40 parts |
| Toluene | 50 parts |

<Intermediate layer> Layer thickness of 0.6 μm

| | |
|---|---|
| Polyvinyl butyral resin (S-lec BX-1, manufactured by Sekisui Chemical Co., Ltd.) | 5 parts |
| Toughtex M-1913 (manufactured by Asahi Chemical Industry Co., Ltd.) | 3 parts |
| Curing agent polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

| <Adhesive layer Liquid Coating Composition> Layer thickness of 0.3 μm | |
|---|---|
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was achieved at 70° C. for 30 seconds.

While employing Transfer Foil 9 constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Foil 10)

The releasing layer, the non-photocurable resin layer, the intermediate layer and the adhesive layer, formulated as below, were successively applied onto one surface of polyethylene terephthalate sheet (S-25), manufactured by Daiafoil Hoechst Co., Ltd., employing wire bar coating.

| (Releasing Layer) Coated amount of 0.2 g/m² | |
|---|---|
| Polyvinyl alcohol (GL-05, manufactured by Nippon Synthetic Chemical Industry Co., Ltd.) | 10 parts |
| Water | 90 parts |

After coating the releasing layer was dried at 30° C. for 30 seconds.

| (Non-photocurable Resinous Layer) Coated amount of 8.0 g/m² | |
| --- | --- |
| Acryl based resin (Dianal BR-87, manufactured by Mitsubishi Rayon Co., Ltd.) | 5 parts |
| Polyvinyl acetoacetal (having an SP value of 9.4) (KS-1, manufactured by Sekisui Chemical Co., Ltd.) | 5 parts |
| Methyl ethyl ketone | 40 parts |
| Toluene | 50 parts |
| <Intermediate layer> Layer thickness of 0.6 μm | |
| Polyvinyl butyral resin (S-lec BX-1, manufactured by Sekisui Chemical Co., Ltd.) | 5 parts |
| Toughtex M-1913 (manufactured by Asahi Chemical Industry Co., Ltd.) Co., Ltd.) | 3 parts |
| Curing agent polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

| <Adhesive layer Liquid Coating Composition> Layer thickness of 0.3 μm | |
| --- | --- |
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was carried out at 70° C. for 30 seconds.

While employing Transfer Foil 10 constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Foil 11)

The releasing layer, the photo-cured resin layer, the optically variable element layer, the intermediate layer, the intermediate layer (the primer layer), and the adhesive layer, formulated as below, were successively applied onto one surface of polyethylene terephthalate sheet (S-25), manufactured by Daiafoil Hoechst Co., Ltd., employing wire bar coating.

(Releasing Layer) Coating amount of 0.2 g/m²

(Preparation of Antistatic Layer)

(Preparation of Electrically Conductive Minute Metal Oxide Particle Dispersion-1)

Dissolved in 2,000 ml of water/ethanol mixed solution was 65 g of stannic chloride hydrate. After preparing the completely dissolved solution, the resulting solution was boiled to form co-precipitates. The resulting precipitates were collected by decantation and well washed with distilled water. After confirming that by dripping a silver nitrate solution into water which had washed the precipitates, chloride ions underwent no reaction, distilled water was added to result in a solid concentration of 8 percent by weight. Further, 40 ml of 30 percent ammonia water was added and heated in a water bath, whereby Electrically Conductive Minute Metal Oxide Particle Dispersion-1 was prepared.

| (Antistatic Layer Liquid Coating Composition) | |
| --- | --- |
| Aforesaid Electrically Conductive Minute Metal Oxide Particle Dispersion-1 | 300 weight parts |
| Copolymer latex of butyl acrylate/ styrene/glycidyl acrylate at a weight ratio of 40/20/40 (30 weight percent solids) | 64 weight parts |
| Copolymer latex of butyl acrylate/ t-butyl acrylate/styrene/ 2-hydroxyacrylate at a weight ratio of 10/35/30/25 (30 weight percent solids) | 16 weight parts |
| Pure water | 620 weight parts |

After coating, drying was carried out at 120° C. for 2 minutes.

| (Photo-cured resin layer) Coated amount of 5.0 g/m² | |
| --- | --- |
| A-9300, manufactured by Shin-Nakamura Chemical Industry Co., Ltd./EA-1020, manufactured by Shin-Nakamura Chemical Industry Co., Ltd. at a weight ratio of 35/11 | 75 parts |
| Reaction initiator (Irugacure 184, manufactured by Ciba-Geigy Japan Limited) | 5 parts |
| Resin 1 used in the actinic radiation curable layer | 48 parts |
| Toluene | 500 parts |

After coating, the actinic radiation curable compound was dried at 90° C. for 30 seconds and subsequently photocured employing a mercury lamp (300 mJ/cm²).

(Optically Variable Element Layer) Layer thickness of 2 μm

| <Intermediate layer> Layer thickness of 0.6 μm | |
| --- | --- |
| Polyvinyl butyral resin (S-lec BX-1, manufactured by Sekisui Chemical Co., Ltd.) | 4 parts |
| Toughtex M-1913 (manufactured by Asahi Chemical Industry Co., Ltd.) | 3 parts |
| Curing agent polyisocyanate (Coronate HX, manufactured by Nippon Polyurethane Industry Co., Ltd.) | 2 parts |
| Ultraviolet absorbent (Tinuvin-P, manufactured by Ciba-Geigy Corp.) | 1 part |
| Methyl ethyl ketone | 90 parts |

After coating, the curing agent was cured at 50° C. for 24 hours.

| <Primer Layer> Layer thickness of 1.2 μm | |
| --- | --- |
| Polyvinyl butyral resin (S-lec BX-1, manufactured by Sekisui Chemical Co., Ltd.) | 3 parts |

-continued

<Primer Layer> Layer thickness of 1.2 μm

| | |
|---|---|
| Ebofriend A-1020 (Dicel Chemical Industries, Ltd.) | 5 parts |
| Curing agent polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

<Adhesive layer Liquid Coating Composition> Layer thickness of 0.3 μm

| | |
|---|---|
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was carried out at 70° C. for 30 seconds.

While employing Actinic Radiation Cured Transfer Foil 11 constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Foil 12)

The releasing layer, the photo-cured resin layer, the intermediate layer, and the adhesive layer, formulated as below, were successively applied onto one surface of polyethylene terephthalate sheet (S-25), manufactured by Daiafoil Hoechst Co., Ltd., employing wire bar coating.

(Releasing Layer) Coated amount of 0.2 g/m²

| | |
|---|---|
| Polyvinyl alcohol (GL-05, manufactured by Nippon Synthetic Chemical Industry Co., Ltd.) | 10 parts |
| Water | 90 parts |

After coating the releasing layer was dried at 90° C. for 30 seconds.

(Photo-cured resin layer) Coated amount of 8.0 g/m²

| | |
|---|---|
| A-9300, manufactured by Shin-Nakamura Chemical Industry Co., Ltd./EA-1020, manufactured by Shin-Nakamura Chemical Industry Co., Ltd. at a weight ratio of 35/11 | 75 parts |
| Reaction initiator (Irugacure 184, manufactured by Ciba-Geigy Japan Limited) | 5 parts |
| Resin 1 used in the actinic radiation curable layer | 47 parts |

(Photo-cured resin layer) Coated amount of 8.0 g/m²

| | |
|---|---|
| Ultraviolet absorbent (Tinuvin-P, manufactured by Ciba-Geigy Corp.) | 1 part |
| Toluene | 500 parts |

After coating, the actinic radiation curable compound was dried at 90° C. for 30 seconds and subsequently photocured employing a mercury lamp (300 mJ/cm²).

<Intermediate layer> Layer thickness of 0.6 μm

| | |
|---|---|
| Polyvinyl butyral resin (S-lec BX-1, manufactured by Sekisui Chemical Co., Ltd.) | 5 parts |
| Toughtex M-1913 (manufactured by Asahi Chemical Industry Co., Ltd.) | 3 parts |
| Curing agent polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

<Adhesive layer Liquid Coating Composition> Layer thickness of 0.3 μm

| | |
|---|---|
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was carried out at 70° C. for 30 seconds.

While employing Actinic Radiation Cured Transfer Foil 5 constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Foil 13)

The releasing layer, the photo-cured resin layer, the intermediate layer, the intermediate layer (the primer layer), and the adhesive layer, formulated as below, were successively applied onto a non-antistatic treated surface of Teijin Tetron Film G2P8-25μ (PET which is subjected to an antistatic treatment on one side), employing wire bar coating.

(Releasing Layer) Coated amount of 0.2 g/m²

| | |
|---|---|
| Polyvinyl alcohol (GL-05, manufactured by Nippon Synthetic Chemical Industry Co., Ltd.) | 10 parts |
| Water | 90 parts |

After coating the releasing layer was dried at 90° C. for 30 seconds.

| (Photo-cured resin layer) Coated amount of 8.0 g/m² | |
| --- | --- |
| A-9300, manufactured by Shin-Nakamura Kagaku Co./EA-1020, manufactured by Shin-Nakamura Chemical Industry Co., Ltd. at a weight ratio of 35/11 | 75 parts |
| Reaction initiator (Irugacure 184, manufactured by Ciba-Geigy Japan Limited) | 5 parts |
| Resin 1 used in the actinic radiation curable layer | 48 parts |
| Toluene | 500 parts |

After coating, the actinic radiation curable compound was dried at 90° C. for 30 seconds and subsequently photocured employing a mercury lamp (300 mJ/cm²).

| <Intermediate layer> Layer thickness of 0.6 μm | |
| --- | --- |
| Polyvinyl butyral resin (S-lec BX-1, manufactured by Sekisui Chemical Co., Ltd.) | 4 parts |
| Toughtex M-1913 (manufactured by Asahi Chemical Industry Co., Ltd.) | 4 parts |
| Curing agent polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

| (Intermediate layer Second Layer (Primer Layer)) | |
| --- | --- |
| Polyvinyl butyral resin (S-lec BX-1, manufactured by Sekisui Chemical Co., Ltd.) | 3 parts |
| Ebofriend A-1020 (Dicel Chemical Industries, Ltd.) | 4 parts |
| Curing agent polyisocyanate (Coronate HX, manufactured by Nippon Polyurethane Industry Co., Ltd.) | 2 parts |
| Ultraviolet absorbent (Tinuvin-928, manufacture by Ciba-Geigy Corp.) | 1 part |
| Methyl ethyl ketone | 90 parts |

After coating, the curing agent was cured at 50° C. for 24 hours.

| <Adhesive layer Liquid Coating Composition> Layer thickness of 0.3 μm | |
| --- | --- |
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was carried out at 70° C. for 30 seconds.

While employing Actinic Radiation Cured Transfer Foil 13 constituted as above, transfer was achieved onto the aforesaid text recorded image receiving medium or information carrier layer, employing a 5 cm diameter heating roller of a rubber hardness of 85 heated to 200° C. at a pressure of 150 kg/cm² for 1.2 seconds.

(Transfer Foil 14)

The releasing layer, the photo-cured resin layer, the intermediate layer, the intermediate layer (the primer layer), and the adhesive layer, formulated as below, were successively applied onto a non-antistatic treated surface of Teijin Tetron Film G2P8-25μ (PET film which is subjected to an antistatic treatment on one side), employing wire bar coating.

| (Releasing Layer) Coated amount of 0.2 g/m² | |
| --- | --- |
| Polyvinyl alcohol (GL-05, manufactured by Nippon Synthetic Chemical Industry Co., Ltd.) | 10 parts |
| Water | 90 parts |

After coating, the releasing layer was dried at 90° C. for 30 seconds.

| (Photo-cured resin layer) Coated amount of 8.0 g/m² | |
| --- | --- |
| A-9300, manufactured by Shin-Nakamura Chemical Industry Co., Ltd./EA-1020, manufactured by Shin-Nakamura Chemical Industry Co., Ltd. at a weight ratio of 35/11 | 75 parts |
| Reaction initiator (Irugacure 184, manufactured by Ciba-Geigy Japan Limited) | 5 parts |
| Resin 1 used in the actinic radiation curable layer | 48 parts |
| Toluene | 500 parts |

After coating, the actinic radiation curable compound was dried at 90° C. for 30 seconds and subsequently photocured employing a mercury lamp (300 mJ/cm²).

| <Intermediate layer> Layer thickness of 0.6 μm | |
| --- | --- |
| Polyvinyl butyral resin (S-lec BX-1, manufactured by Sekisui Chemical Co., Ltd.) | 4 parts |
| Toughtex M-1913 (manufactured by Asahi Chemical Industry Co., Ltd.) | 4 parts |
| Curing agent polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

| (Intermediate layer Second Layer (Primer Layer)) | |
| --- | --- |
| Polyvinyl butyral resin (S-lec BX-1, manufactured by Sekisui Chemical Co., Ltd.) | 3 parts |
| Epofriend A-1020 (Dicel Chemical Industries, Ltd.) | 4 parts |
| Curing agent polyisocyanate (Coronate HX, manufactured by Nippon Polyurethane Industry Co., Ltd.) | 2 parts |

| (Intermediate layer Second Layer (Primer Layer)) | |
|---|---|
| Ultraviolet absorbent (Tinuvin-400, manufacture by Cuba-Geigy Corp.) | 1 part |
| Methyl ethyl ketone | 90 parts |

After coating, the curing agent was cured at 50° C. for 24 hours.

| <Adhesive layer Liquid Coating Composition> Layer thickness of 0.3 μm | |
|---|---|
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was carried out at 70° C. for 30 seconds.

While employing Actinic Radiation Cured Transfer Foil 14 constituted as above, transfer was achieved onto the aforesaid text recorded image receiving medium or information carrier layer, employing a 5 cm diameter heating roller of a rubber hardness of 85 heated to 200° C. at a pressure of 150 kg/cm$^2$ for 1.2 seconds.

(Transfer Foil 15)

The releasing layer, the photo-cured resin layer, the intermediate layer and the adhesive layer, formulated as below, were successively applied onto one surface of polyethylene terephthalate sheet (S-25), manufactured by Daiafoil Hoechst Co., Ltd., employing wire bar coating.

| (Releasing Layer) Coated amount of 0.2 g/m$^2$ | |
|---|---|
| Polyvinyl alcohol (GL-05, manufactured by Nippon Synthetic Chemical Industry Co., Ltd.) | 10 parts |
| Water | 90 parts |

After coating the releasing layer was dried at 90° C. for 30 seconds.

| (Photo-cured resin layer) Coated amount of 8.0 g/m$^2$ | |
|---|---|
| A-9300, manufactured by Shin-Nakamura Chemical Industry Co., Ltd./EA-1020, manufactured by Shin-Nakamura Chemical Industry Co., Ltd. at a weight ratio of 35/11 | 75 parts |
| Reaction initiator (Irugacure 184, manufactured by Ciba-Geigy Japan Limited) | 5 parts |
| Resin 1 used in the actinic radiation curable layer | 48 parts |
| Toluene | 500 parts |

After coating, the actinic radiation curable compound was dried at 90° C. for 30 seconds and subsequently photocured employing a mercury lamp (300 mJ/cm$^2$).

| <Intermediate layer> Layer thickness of 0.6 μm | |
|---|---|
| PKHA (phenoxy resin, manufacture by Union Carbide Co.) | 5 parts |
| Toughtex M-1913 (Asahi Chemical Industry Co., Ltd.) | 3 parts |
| Curing agent polyisocyanate (Coronate HX, manufactured by Nippon Polyurethane Industry Co., Ltd.) | 2 parts |
| Methyl ethyl ketone | 90 parts |

After coating, the curing agent was cured at 50° C. for 24 hours.

| <Adhesive layer Liquid Coating Composition> Layer thickness of 0.3 μm | |
|---|---|
| Urethane modified ethylene ethyl acrylate copolymer (Hitech S6254B, manufactured by Toho Chemical Industry Company Limited) | 8 parts |
| Polyacrylic acid ester copolymer (Jurymer AT510, manufactured by Nippon Junyaku Co., Ltd.) | 2 parts |
| Water | 45 parts |
| Ethanol | 45 parts |

After coating, drying was carried out at 70° C. for 30 seconds.

While employing Actinic Radiation Curable Transfer Foil 15 constituted as above, transfer was achieved onto the aforesaid text recorded image receiving medium or information carrier layer, employing a 5 cm diameter heating roller of a rubber hardness of 85 heated to 200° C. at a pressure of 150 kg/cm$^2$ for 1.2 seconds.

(Evaluation Methods)

<Measurement Method of Scratch Resistance (Abrasion Resistance)>

The surface of the prepared card was rubbed by a 0.1 mmφ sapphire needle under a variable load, employing a rub tester, and the load at which abrasion resulted on the writing layer surface was determined. The greater the load, the better the scratch resistance.

<Dust Adhesion Properties of Cards>

Five hundred cards were prepared and the number of dust particles on the cards, i.e., a generation ratio was calculated.

<Bug Forming Properties of Apparatus>

At an ambience of 23°/20° C., 500 cards were continuously prepared and any occurrence of problems due to the formation of bugs in the apparatus was evaluated.

<Evaluation of Chemical Resistance>

Finished cards were immersed in a 50 percent IPA solution at a temperature of 25° C. for one day and the back surface of the card was observed. The criteria described below were visually evaluated.

A: No difference was noted from the initial card
B: At least 50 percent of image information was blurred
C: Image information was lost <Lightfastness>

A portion of the cyan reflection density D of 1.0 of the resulting printed samples was left standing in a xenon fade meter (at 70,000 lux) for two weeks. Thereafter, the residual density ratio was evaluated based on the criteria below.

A: At least 90 percent
B: Between 80–90 percent
C: Between 70–80 percent
D: Less than 70 percent <Evaluation of Tape Peeling (Adhesion Property)>

Cellophane adhesive tape (manufactured by Nichiban Co., Ltd.) was securely adhered onto the surface of the cured protective layer and subsequently was quickly peeled from the surface. Thereafter, the peeled state was evaluated based on JIS K 5400 Method specified by the Checkered Tape Method. Table 1 shows the results.

The surface of the protective layer was cut to the substrate at an angle of 30 degrees, employing a sharp edged tool such as a knife so that the cut reached the substrate. Cutting was carried out to form 100 squares (10×10) of a side length in the range of 1.0–1.5 mm of a checkered pattern. In such cases, the number of the coated layer, which were not peeled, was determined. When the entire coated layer exhibited fairly acceptable adhesion property, a checkered pattern as above was made and adhesive tape was then adhered onto the resulting pattern. Subsequently, the tape was peeled away and the portion in the thickness direction of the checkered pattern and the number of peeled squares were determined.

Evaluation was carried out based on the evaluation point method below.

Evaluation Point of Checkered Pattern Test

| Evaluation Point | Peeling State |
|---|---|
| 10 | Each of the cutting lines was narrow, both sides were smooth, and each of the squares at the intersection of cutting lines was not peeled. |
| 8 | Slight peeling occurred at the intersection of cutting lines, but none of the squares was peeled. The ratio of the peeled area was at most 5 percent of the total area of the squares. |
| 6 | Peeling occurred on both sides as well as at the intersection of the cutting lines, and the ratio of the peeled area was 5–15 percent of the total area of the squares. |
| 4 | Cutting resulted in relatively wide peeling, and the ratio of the peeled area was 15–35 percent of the total area of the squares. |
| 2 | The width of the peeled area was more than that in point 4, and the ratio of the peeled area was 35–65 percent of the total area of the squares. |
| 0 | The ratio of the peeled area was 65 percent or more of the total area of the squares. |

TABLE 1-1

Preparation Method ID Card and Results

| | | | | | *6 | | | | Evaluation Results of IC Card | | | | | |
|---|---|---|---|---|---|---|---|---|---|---|---|---|---|---|
| | | *3 | | | *7 | | *10 | | | | | | | |
| *1 | *2 | *4 | *5 | *8 | *9 | *8 | *9 | *11 | *12 | *13 | *14 | *15 | *16 | Remarks |
| Example 1 | *17 | FIG. 15 | 1 | — | 6 | 28 | — | — | 148 | 0 | A | C | A | 10 |
| Example 2 | *17 | FIG. 16 | 1 | 1 | 6 | 28 | 6 | 28 | 253 | 0 | A | C | A | 10 |
| Example 3 | *17 | FIG. 16 | 4 | 1 | 8 | 32 | 6 | 28 | 211 | 0 | A | C | AB | 4 |
| Example 4 | *17 | FIG. 16 | 5 | 1 | 10 | 35 | 6 | 28 | 230 | 2.4 | A | C | AB | 8 |
| Example 5 | *17 | FIG. 16 | 1 | 4 | 6 | 28 | 8 | 32 | 251 | 0 | A | C | A | 10 |
| Example 6 | *17 | FIG. 16 | 1 | 5 | 6 | 28 | 10 | 35 | 264 | 3.6 | A | C | A | 10 |
| Example 7 | *17 | FIG. 16 | 1 | 6 | 6 | 28 | 14 | 40 | 175 | 1.8 | A | C | A | 10 |
| Example 8 | *17 | FIG. 16 | 1 | 9 | 6 | 28 | 6 | 29 | 152 | 0 | A | C | C | 10 |
| Example 9 | *18 | FIG. 15 | 1 | — | 4 | 20 | — | — | 150 | 0 | A | C | A | 10 |
| Example 10 | *18 | FIG. 16 | 1 | 1 | 4 | 20 | 6 | 28 | 259 | 0 | A | C | A | 10 |
| Example 11 | *18 | FIG. 16 | 1 | 5 | 4 | 20 | 10 | 35 | 260 | 0 | A | C | A | 10 |
| Example 12 | *18 | FIG. 16 | 5 | 1 | 6 | 31 | 6 | 28 | 255 | 3.8 | A | C | AB | 8 |
| Example 13 | *18 | FIG. 16 | 6 | 1 | 11 | 33 | 6 | 28 | 170 | 1.8 | A | C | AB | 8 |

*1; ID Card Substrate
*2; ID Card Preparation Apparatus
*3; Protective layer Transfer Foil
*4; First Surface Layer (card side)
*5; Second Surface Layer (Uppermost Surface Layer)
*6; Maximum Electrostatic Charge
*7; First Surface Layer
*8; ID Card (KV)
*9; Peeling Layer (KV)
*10; Second Surface Layer TABLE 1-1-continued

|  |  |  | Preparation Method ID Card and Results |  |  |  |  |  |  |  |  |  |  |  |  |
|---|---|---|---|---|---|---|---|---|---|---|---|---|---|---|---|
|  |  |  |  |  | *6 |  |  | Evaluation Results of IC Card |  |  |  |  |  |  |
|  |  |  | *3 |  | *7 |  | *10 |  |  |  |  |  |  |  |
| *1 | *2 | *4 | *5 | *8 | *9 | *8 | *9 | *11 | *12 | *13 | *14 | *15 | *16 | Remarks |

*11; Scratch Resistance
*12; Ratio of Cards with Adhered Dust Particles (percent)
*13; Apparatus Bugs
*14; Light fastness
*15; Chemical Resistance
*16; Tape Peeling
*17; ID Card Substrate 1
*18; ID Card Substrate 2

TABLE 1-2

|  |  |  | Preparation Method ID Card and Results |  |  |  |  |  |  |  |  |  |  |  |  |
|---|---|---|---|---|---|---|---|---|---|---|---|---|---|---|---|
|  |  |  |  |  | *6 |  |  | Evaluation Results of IC Card |  |  |  |  |  |  |
|  |  |  | *3 |  | *7 |  | *10 |  |  |  |  |  |  |  |
| *1 | *2 | *4 | *5 | *8 | *9 | *8 | *9 | *11 | *12 | *13 | *14 | *15 | *16 | Remarks |
| *19 1 | *17 | FIG. 15 | 3 | — | 6 | 27 | — | — | 95 | 0 | A | C | AB | 10 |
| *19 2 | *17 | FIG. 15 | 5 | — | 10 | 35 | — | — | 130 | 12.4 | B | C | A | 10 |
| *19 3 | *17 | FIG. 15 | 6 | — | 14 | 40 | — | — | 96 | 7.2 | A | C | A | 10 |
| *19 4 | *17 | FIG. 15 | 9 | — | 6 | 29 | — | — | 80 | 0 | A | C | C | 10 |
| *19 5 | *17 | FIG. 15 | 10 | — | 16 | 42 | — | — | 75 | 1.2 | A | C | C | 10 |
| *19 6 | *17 | FIG. 16 | 3 | 9 | 6 | 29 | 6 | 29 | 110 | 0 | A | C | C | 10 |
| *19 7 | *17 | FIG. 16 | 3 | 10 | 6 | 27 | 16 | 42 | 102 | 5.8 | A | C | C | 10 |
| *19 8 | *17 | FIG. 16 | 4 | 9 | 8 | 32 | 6 | 29 | 146 | 0.6 | A | C | B | 4 |
| *19 9 | *17 | FIG. 16 | 4 | 10 | 8 | 32 | 16 | 42 | 163 | 1.2 | A | C | C | 4 |
| *19 10 | *18 | FIG. 15 | 3 | — | 3 | 24 | — | — | 80 | 0 | A | C | A | 10 |
| *19 11 | *18 | FIG. 15 | 6 | — | 11 | 33 | — | — | 82 | 6.4 | A | C | AB | 8 |
| *19 12 | *18 | FIG. 15 | 9 | — | 3 | 20 | — | — | 106 | 0 | A | C | C | 10 |
| *19 13 | *18 | FIG. 16 | 3 | 10 | 3 | 24 | 16 | 42 | 123 | 7.2 | A | C | C | 10 |

*1; ID Card Substrate
*2; ID Card Preparation Apparatus
*3; protective layer transfer Foil
*4; First Surface Layer (card side)
*5; Second Surface Layer (Uppermost Surface Layer)
*6; Maximum Electrostatic Charge
*7; First Surface Layer
*8; ID Card (KV)
*9; Peeling Layer KV
*10; Second Surface Layer
*11; Scratch Resistance
*12; Ratio of Cards with Adhered Dust Particles (percent)
*13; Apparatus Bugs
*14; Light fastness
*15; Chemical Resistance
*16; Tape Peeling
*17; ID Card Substrate 1
*18; ID Card Substrate 2
*19; Comparative Example

TABLE 1-3

|  |  |  | Preparation Method ID Card and Results |  |  |  |  |  |  |  |  |  |  |  |  |
|---|---|---|---|---|---|---|---|---|---|---|---|---|---|---|---|
|  |  |  |  |  | *6 |  |  | Evaluation Results of IC Card |  |  |  |  |  |  |
|  |  |  | *3 |  | *7 |  | *10 |  |  |  |  |  |  |  |
| *1 | *2 | *4 | *5 | *8 | *9 | *8 | *9 | *11 | *12 | *13 | *14 | *15 | *16 | Remarks |
| Example 14 | *17 | FIG. 15 | 7 | — | 6 | 27 | — | — | 156 | 0 | A | B | A | 10 |
| Example 15 | *17 | FIG. 15 | 8 | — | 6 | 27 | — | — | 162 | 0 | A | B | A | 10 |

TABLE 1-3-continued

| | | | Preparation Method ID Card and Results | | | | | | Evaluation Results of IC Card | | | | | | |
|---|---|---|---|---|---|---|---|---|---|---|---|---|---|---|---|
| | | | | | *6 | | | | | | | | | | |
| | | | *3 | | *7 | | *10 | | | | | | | | |
| | *1 | *2 | *4 | *5 | *8 | *9 | *8 | *9 | *11 | *12 | *13 | *14 | *15 | *16 | Remarks |
| Example 16 | *17 | FIG. 15 | 11 | — | 6 | 25 | — | — | 143 | 0 | A | B | A | 10 | |
| Example 17 | *17 | FIG. 16 | 1 | 7 | 6 | 28 | 6 | 27 | 246 | 0 | A | B | A | 10 | |
| Example 18 | *17 | FIG. 16 | 1 | 8 | 6 | 28 | 6 | 27 | 262 | 0 | A | B | A | 10 | |
| Example 19 | *17 | FIG. 16 | 1 | 11 | 6 | 28 | 6 | 25 | 241 | 0 | A | B | A | 10 | |
| Example 20 | *17 | FIG. 16 | 7 | 7 | 6 | 27 | 6 | 27 | 250 | 0 | A | A | A | 10 | |
| Example 21 | *17 | FIG. 16 | 5 | 8 | 10 | 35 | 6 | 27 | 246 | 1.2 | A | B | AB | 10 | |
| Example 22 | *18 | FIG. 15 | 7 | — | 4 | 22 | — | — | 153 | 0 | A | B | A | 10 | |
| Example 23 | *18 | FIG. 15 | 8 | — | 4 | 22 | — | — | 159 | 0 | A | B | A | 10 | |
| Example 24 | *18 | FIG. 15 | 11 | — | 3 | 18 | — | — | 146 | 0 | A | B | A | 10 | |
| Example 25 | *18 | FIG. 16 | 8 | 7 | 4 | 20 | 6 | 27 | 275 | 0 | A | A | A | 10 | |
| Example 26 | *18 | FIG. 16 | 5 | 7 | 6 | 31 | 6 | 27 | 265 | 0 | A | B | AB | 10 | |
| Example 27 | *18 | FIG. 16 | 5 | 8 | 6 | 31 | 6 | 27 | 268 | 0 | A | B | AB | 10 | |

*1; ID Card Substrate
*2; ID Card Preparation Apparatus
*3; Protective layer Transfer Foil
*4; First Surface Layer (card side)
*5; Second Surface Layer (Uppermost Surface Layer)
*6; Maximum Electrostatic Charge
*7; First Surface Layer
*8; ID Card (KV)
*9; Peeling Layer (KV)
*10; Second Surface Layer
*11; Scratch Resistance
*12; Ratio of Cards with Adhered Dust Particles (percent)
*13; Apparatus Bugs
*14; Light fastness
*15; Chemical Resistance
*16; Tape Peeling
*17; ID Card Substrate 1
*18; ID Card Substrate 2

TABLE 1-4

| | | | Preparation Method ID Card and Results | | | | | | Evaluation Results of IC Card | | | | | | |
|---|---|---|---|---|---|---|---|---|---|---|---|---|---|---|---|
| | | | | | *6 | | | | | | | | | | |
| | | | *3 | | *7 | | *10 | | | | | | | | |
| | *1 | *2 | *4 | *5 | *8 | *9 | *8 | *9 | *11 | *12 | *13 | *14 | *15 | *16 | Remarks |
| *19 15 | *17 | FIG. 16 | 10 | 10 | 18 | 45 | 18 | 45 | 146 | 8.6 | B | C | C | 10 | |
| *19 16 | *17 | FIG. 16 | 10 | 6 | 18 | 45 | 14 | 40 | 121 | 7.2 | A | C | C | 10 | |
| *19 17 | *17 | FIG. 16 | 9 | 10 | 6 | 29 | 18 | 45 | 123 | 7.2 | A | C | C | 10 | |
| *19 18 | *17 | FIG. 16 | 12 | — | 11 | 38 | — | — | 105 | 3.0 | A | C | B | 6 | *20 |
| *19 19 | *18 | FIG. 16 | 10 | 10 | 15 | 39 | 18 | 45 | 136 | 15.8 | B | C | C | 10 | |
| *19 20 | *18 | FIG. 16 | 10 | 6 | 15 | 39 | 14 | 40 | 139 | 19.2 | B | C | C | 10 | |
| *19 21 | *18 | FIG. 16 | 12 | 12 | 11 | 38 | 11 | 38 | 158 | 5.8 | A | B | B | 6 | *20 |
| Example 28 | *17 | FIG. 16 | 13 | 13 | 7 | 28 | 7 | 29 | 253 | 0.2 | A | B | A | 10 | |
| Example 29 | *18 | FIG. 16 | 14 | 13 | 4 | 22 | 6 | 25 | 242 | 0 | A | B | A | 10 | |
| Example 30 | *17 | FIG. 16 | 7 | 14 | 6 | 27 | | 25 | 245 | 0 | A | B | A | 10 | |
| Example 31 | *18 | FIG. 16 | 14 | 14 | 4 | 22 | 4 | 22 | 239 | 0 | A | B | A | 10 | |
| *19 22 | *17 | FIG. 15 | 15 | — | 14 | 36 | — | — | 268 | 5.8 | B | B | C | 2 | |
| *19 23 | *17 | FIG. 16 | 16 | 15 | 14 | 36 | 14 | 36 | 240 | 7.2 | A | B | B | 4 | |

*1; ID Card Substrate
*2; ID Card Preparation Apparatus
*3; Protective Layer Transfer Foil
*4; First Surface Layer (card side)
*5; Second Surface Layer (Uppermost Surface Layer)
*6; Maximum Electrostatic Charge
*7; First Surface Layer
*8; ID Card (KV)
*9; Peeling Layer KV
*10; Second Surface Layer
*11; Scratch Resistance TABLE 1-4-continued Preparation Method ID Card and Results

|  |  |  | *6 |  |  |  | Evaluation Results of IC Card |  |  |  |  |  |  |
|---|---|---|---|---|---|---|---|---|---|---|---|---|---|
|  |  | *3 | *7 | *10 |  |  |  |  |  |  |  |  |  |
| *1 | *2 | *4 | *5 | *8 | *9 | *8 | *9 | *11 | *12 | *13 | *14 | *15 | *16 | Remarks |

*12; Ratio of Cards with Adhered Dust Particles (percent)
*13; Apparatus Bugs
*14; Light fastness
*15; Chemical Resistance
*16; Tape Peeling
*17; ID Card Substrate 1
*18; ID Card Substrate 2
*19; Comparative Example
*20; During peeling the tape, adhesion failure of the photo cured layer occurred.

EFFECTS OF THE INVENTION

AS noted above, according to the invention, lamination properties (adhesion properties) as well as scratch resistance is improved, and it becomes possible to prepare identification cards having an improved lamination properties (adhesion properties) as well as scratch resistance, and to prove identification cards of negligible appearance degradation due to minimal adhesion of dust on the card surface, and apparatus bugs are effectively minimized.

Further, according to the invention, it is possible to enhance security at thwarting of forgery and falsification as well as to enhance scratch resistance of ID cards.

What is claimed is:

1. A preparation method of an identification card with utilizing a protective layer transfer foil and a card substrate, the preparation method comprising:
   providing the protective layer foil having a peeling layer and a transferring layer laminated on the peeling layer adhering the transferring layer onto the card substrate; and
   peeling off the peeling layer to prepare the identification card,
   wherein the peeling layer includes a support and a releasing layer having a coated amount of more than 0 and not more than 3.0 g/m², and the transferring layer includes a photo-cured resin layer having a coated amount of 3.0 to 15 g/m²,
   wherein a the peeling layer at the peeling step has a maximum electrostatic charge of at most 30 kV.

2. A preparation method of an identification card with utilizing a protective layer transfer foil and a card substrate, the preparation method comprising:
   providing the protective layer foil having a peeling layer and a transferring layer laminated on the peeling layer adhering the transferring layer onto the card substrate; and
   peeling off the peeling layer to prepare the identification card,
   wherein the peeling layer includes a support and a releasing layer having a coated amount of more than 0 and not more than 3.0 g/m², and the transferring layer includes a photo-cured resin layer having a coated amount of 3.0 to 15 g/m²,
   wherein a the identification card at the peeling step has a maximum electrostatic charge of at most 10 kV.

3. The preparation method of claim 1, wherein a maximum electrification charge of the identification card at the peeling step has maximum electrostatic charge of at most 10 kV.

4. The preparation method of claim 1, wherein the protective layer transfer foil further includes an antistatic layer.

5. The preparation method of claim 4, wherein the protective layer transfer foil includes the antistatic layer between the support and the photo-cured resin layer.

6. The preparation method of claim 5, wherein the peeling layer includes the antistatic layer.

7. The preparation method of claim 6, wherein the peeling layer includes the antistatic layer between the releasing layer and the support.

8. The preparation method of claim 5, wherein the transferring layer includes the antistatic layer.

9. The preparation method of claim 1, wherein the releasing layer contains an antistatic agent.

10. The preparation method of claim 4, wherein the antistatic layer contains at least one of metal oxide particles, electrically conductive powder and electrically conductive resin.

11. The preparation method of claim 10, wherein the antistatic layer contains the metal oxide particles.

12. The preparation method of claim 1, wherein the transferring layer further includes an intermediate layer or an adhesive layer, the intermediate layer or the adhesive layer being adjacent to the photo-cured resin layer and containing a polyvinylbutyral resin or polybutyral and at least one of an ultraviolet absorbent, an antioxidant and a photo stabilizer.

13. The preparation method of claim 12, wherein the intermediate layer or the adhesive layer containing the ultraviolet absorbent.

14. The preparation method of claim 1, wherein the card substrate includes a first sheet member and a second sheet member laminated on the first sheet member, the first sheet member containing an image receptive layer being capable of receiving a sublimation dye image or a heat diffusible dye image, the second sheet member containing a writing layer.

15. The preparation method of claim 14, wherein the preparation method further comprises providing a first protective layer on the card substrate, and then the transferring layer is provided on the first protective layer by the adhering step and the peeling step.

16. The preparation method of claim 1, wherein in the peeling step, a peeling angle of the peeling layer and the identification card is 1 to 120 degree.

17. The preparation method of claim 16, wherein the peeling angle is 1 to 100 degree.

* * * * *